(12) United States Patent
Ehmann et al.

(10) Patent No.: US 10,152,112 B2
(45) Date of Patent: Dec. 11, 2018

(54) POWER MANAGER WITH A POWER SWITCH ARBITRATOR

(71) Applicant: Sonics, Inc., Milpitas, CA (US)

(72) Inventors: Gregory Ehmann, Sleepy Hollow, IL (US); Drew E. Wingard, Palo Alto, CA (US); Neal T. Wingen, Inverness, IL (US)

(73) Assignee: Sonics, Inc., San Jose, CA (US)

( * ) Notice: Subject to any disclaimer, the term of this patent is extended or adjusted under 35 U.S.C. 154(b) by 151 days.

(21) Appl. No.: 15/177,564

(22) Filed: Jun. 9, 2016

(65) Prior Publication Data

US 2016/0363985 A1 Dec. 15, 2016

Related U.S. Application Data

(60) Provisional application No. 62/173,851, filed on Jun. 10, 2015.

(51) Int. Cl.
*G06F 1/32* (2006.01)
*G06F 13/37* (2006.01)
*G06F 13/40* (2006.01)
*G06F 9/4401* (2018.01)

(52) U.S. Cl.
CPC ............ *G06F 1/3287* (2013.01); *G06F 1/329* (2013.01); *G06F 1/3228* (2013.01); *G06F 9/4403* (2013.01); *G06F 13/37* (2013.01); *G06F 13/4031* (2013.01); *Y02D 10/151* (2018.01); *Y02D 10/171* (2018.01); *Y02D 10/24* (2018.01)

(58) Field of Classification Search
None
See application file for complete search history.

(56) References Cited

U.S. PATENT DOCUMENTS

| 2,852,913 | A | 9/1958 | Jorgensen et al. |
| 3,252,283 | A | 5/1966 | Jackson et al. |
| 4,254,345 | A | 3/1981 | Ullrich |

(Continued)

OTHER PUBLICATIONS

U.S. Appl. No. 61/551,917, filed Oct. 26, 2011, LeCler.

(Continued)

*Primary Examiner* — Paul Yen
*Assistant Examiner* — Danny Chan
(74) *Attorney, Agent, or Firm* — Rutan & Tucker LLP

(57) ABSTRACT

An arbitrator governs an arbitration between different power domains and sequences powering up the different power domains supplied by the same voltage supply (VS) circuit on the Chip. The arbitrator has sequencing logic that limits how many different power domains simultaneously power up to a maximum amount, which is less than enough instantaneous electrical current drawn on the VS-circuit to cause a reduction below a minimum allowable supply voltage level for the VS-circuit. The sequencing logic manages the sequencing of powering up the different power domains by factoring in i) whether different power domains arbitrating to power up are part of a set of power domains that share the VS-circuit, ii) an amount of an instantaneous electrical current drawn, and iii) an amount of credits available before the minimum allowable supply voltage level occurs for that VS-circuit. The sequencing logic controls a behavior of the power domains when powering up from multiple different behaviors.

19 Claims, 15 Drawing Sheets

(56) References Cited

U.S. PATENT DOCUMENTS

| | | | |
|---|---|---|---|
| 4,775,955 A | 10/1988 | Liu | |
| 5,110,269 A | 5/1992 | Fallon | |
| 5,339,636 A | 8/1994 | Donnelly et al. | |
| 5,841,775 A | 11/1998 | Huang | |
| 5,899,058 A | 5/1999 | Narcus et al. | |
| 5,948,089 A | 9/1999 | Wingard et al. | |
| 6,145,318 A | 11/2000 | Kaplan et al. | |
| 6,182,183 B1 | 1/2001 | Wingard et al. | |
| 6,330,225 B1 | 12/2001 | Weber et al. | |
| 6,357,219 B1 | 3/2002 | Dudd, Jr. et al. | |
| 6,359,861 B1 | 3/2002 | Sui | |
| 6,578,117 B2 | 6/2003 | Weber | |
| 6,617,877 B1 | 9/2003 | Cory et al. | |
| 6,725,313 B1 | 4/2004 | Wingard et al. | |
| 6,751,710 B2 | 6/2004 | Gharachorloo et al. | |
| 7,051,306 B2 | 5/2006 | Hoberman et al. | |
| 7,093,024 B2 | 8/2006 | Craddock et al. | |
| 7,120,712 B2 | 10/2006 | Wingard et al. | |
| 7,251,256 B1 | 7/2007 | Barry et al. | |
| 7,325,050 B2 | 1/2008 | O'Connor et al. | |
| 7,325,221 B1 | 1/2008 | Wingard et al. | |
| 7,366,847 B2 | 4/2008 | Kruckemyer et al. | |
| 7,415,680 B2 | 8/2008 | Hoberman et al. | |
| 7,512,741 B1 | 3/2009 | Batson et al. | |
| 7,610,572 B2 | 10/2009 | Kanno et al. | |
| 7,644,293 B2 | 1/2010 | Sistla et al. | |
| 7,659,746 B2 | 2/2010 | Chua-Eoan et al. | |
| 7,752,281 B2 | 7/2010 | Rowlands | |
| 7,761,696 B1 | 7/2010 | Bhattacharyya et al. | |
| 7,805,575 B1 | 9/2010 | Agarwal | |
| 7,836,144 B2 | 11/2010 | Mannava | |
| 7,836,229 B1 | 11/2010 | Singh et al. | |
| 7,844,840 B2 | 11/2010 | McShane et al. | |
| 7,890,700 B2 | 2/2011 | Choy et al. | |
| 7,997,062 B2 | 8/2011 | Sun et al. | |
| 8,190,804 B1 | 5/2012 | Srinivasan et al. | |
| 8,365,132 B2 | 1/2013 | Hsu et al. | |
| 8,576,879 B2 | 11/2013 | Scandurra et al. | |
| 8,711,867 B2 | 4/2014 | Guo et al. | |
| 9,417,648 B1* | 8/2016 | Venkatasubramanian | G05F 3/02 |
| 2002/0051427 A1 | 5/2002 | Carvey | |
| 2002/0129173 A1 | 9/2002 | Weber et al. | |
| 2002/0196796 A1 | 12/2002 | Ambe et al. | |
| 2003/0004699 A1 | 1/2003 | Choi et al. | |
| 2003/0074520 A1 | 4/2003 | Weber et al. | |
| 2003/0118048 A1 | 6/2003 | Daily et al. | |
| 2004/0177186 A1 | 9/2004 | Wingard et al. | |
| 2005/0010890 A1 | 1/2005 | Nehmadi et al. | |
| 2005/0240736 A1 | 10/2005 | Shaw | |
| 2005/0276132 A1 | 12/2005 | Severson et al. | |
| 2006/0294399 A1 | 12/2006 | Chen | |
| 2007/0094429 A1 | 4/2007 | Wingard et al. | |
| 2007/0198756 A1 | 8/2007 | Norgaard | |
| 2007/0233918 A1 | 10/2007 | Check et al. | |
| 2008/0028238 A1* | 1/2008 | Lucas | G06F 1/26 713/300 |
| 2008/0136641 A1 | 6/2008 | Kean | |
| 2008/0144670 A1 | 6/2008 | Goossens et al. | |
| 2008/0151909 A1 | 6/2008 | Scott et al. | |
| 2008/0162770 A1 | 7/2008 | Titiano | |
| 2008/0211306 A1* | 9/2008 | Pickholz | G06F 1/26 307/38 |
| 2008/0301708 A1 | 12/2008 | Hamilton | |
| 2008/0307238 A1 | 12/2008 | Bieswanger et al. | |
| 2008/0320233 A1 | 12/2008 | Kinter | |
| 2008/0320476 A1 | 12/2008 | Wingard et al. | |
| 2009/0083493 A1 | 3/2009 | Kinter | |
| 2009/0152948 A1 | 6/2009 | Hoberman et al. | |
| 2009/0204834 A1 | 8/2009 | Hendin et al. | |
| 2009/0254525 A1 | 10/2009 | Srinivasan et al. | |
| 2009/0293061 A1 | 11/2009 | Schwinn et al. | |
| 2010/0174923 A1 | 7/2010 | Houlihan et al. | |
| 2010/0269074 A1* | 10/2010 | Nation | G06F 17/5022 716/136 |
| 2010/0318822 A1 | 12/2010 | Scandurra et al. | |
| 2011/0022826 A1* | 1/2011 | More | G06F 1/26 713/1 |
| 2011/0026405 A1 | 2/2011 | Tagagi et al. | |
| 2011/0078384 A1 | 3/2011 | Kumar et al. | |
| 2011/0161587 A1 | 6/2011 | Guthrie et al. | |
| 2011/0283130 A1 | 11/2011 | Pai et al. | |
| 2012/0036509 A1 | 2/2012 | Srinivasan et al. | |
| 2012/0117301 A1 | 5/2012 | Wingard | |
| 2013/0111148 A1 | 5/2013 | LeCler | |
| 2013/0111149 A1 | 5/2013 | Moll et al. | |
| 2013/0262895 A1* | 10/2013 | Kayama | G06F 1/324 713/322 |
| 2014/0300407 A1 | 10/2014 | Apple | |
| 2014/0314076 A1 | 10/2014 | Guo et al. | |
| 2015/0169021 A1* | 6/2015 | Salessi | G06F 1/266 713/300 |
| 2015/0198933 A1* | 7/2015 | Coutts | H03K 19/0016 307/115 |
| 2016/0179110 A1* | 6/2016 | Rotem | G05F 1/10 327/538 |
| 2016/0231805 A1* | 8/2016 | Culshaw | G06F 1/3287 |

OTHER PUBLICATIONS

Wingard, Drew, Socket-Based Design Using Decoupled Interconnects, 2002, 30 pages, Interconnect-Centric Design for Advanced SOC and NOC.

Weber, Wolf-Dietrich, "Efficient Shared DRAM Subsystems for SOCs", Sonics, Inc., 2001, 6 pages.

OCP (Open Core Protocol) Specification, Release 2.0, OCP International Partnership 2003 OCP-IP Association, pp. 210 total.

Wingard, Drew, "A Non-Blocking Intelligent Interconnect for AMBA-Connected SoCs", Sonics, Inc., CoWare Arm Developer's Conference, Oct. 6, 2005, 39 pages.

Weber, Wolf-Dietrich, et al., "A quality-of-service mechanism for interconnection networks in system-on-chips", 1530-1591/05, 2005 IEEE, 6 pages.

Wingard, Drew: Tiles: "The Heterogeneous Processing Abstraction for MPSoC", Presentation Notes, 2004, Sonics, Inc., 35 p.

Wingard, Drew, "Sonics SOC Integration Architecture," Sonics, Inc., 1999, 25 pages.

Kamas, Alan, "An Overview of the SystemC Models for the Open Core Protocol," 2004, 30 pages.

IEM Technology Overview, ARM Intelligent Energy Manager (IEM) Technology, 2008, 3 pages.

Mazzoni, Luca, "Power Aware Design," IEE Electronics Systems and Software, Oct./Nov. 2003, 6 pages.

"A Configuable Multi-standard Video Decoding Subsystem for Low-power, Low-cost Application," The ARC Subsystem, Nov. 2005, 8 pages.

White Paper for "eXtreme Energy Conservation: Advanced Power-Saving Software for Wireless Devices," Freescale Semiconductor, Rev. #0, Feb. 2006, 15 pages.

White Paper for "Technologies for Optimized Power Management," Freescale Semiconductor, Ref. #0, Feb. 2006, 10 pages.

Flautner, K., et al., "Vertigo: Automatic Performance-Setting for Linux," IEMSoftware Paper OSDI, 2002, 12 pages.

ARM Flyer, National Semiconductor, 2002, 2 pages.

Flautner, K., et al., "A Combined Hardware-Software Approach for Low-Power Socs: Applying Adaptive Voltage Scaling and Intelligent Energy Management Software," DesignCon 2003, National Semiconductor Corp., 17 pages.

Zarr, Richard, "PowerWise Solutions and the Future of Energy Utilization," National Semiconductor, Sep. 2007, 3 pages.

Carlson, Brian, SmartReflex Power and Performance Management, White Paper, 2005, 8 pages.

Wu, Qiang, et al., Formal Online Methods for Voltage Frequency Control in Multiple Clock Domain Microprocessors, ASPLOS, Oct. 2004, 12 pages.

Merkel, Andreas, et al, "Balancing Power Consumption in Multiprocessor Systems," EuroSys, 2006, 12 pages.

(56) References Cited

OTHER PUBLICATIONS

Juang, Philo, et al., "Coordinated, Distributed, Formal Energy Management of Chip Multiprocessors," ISLPED '05, Aug. 2005, 4 pages.
Isci, Canturk, et al., "An Analysis of Efficient Multi-Core Global Power Management Policies: Maximizing Performance for a Given Power Budget," IBM Research, 2006, 12 pages.
Yonker, Mike, White Paper for "How Mobile Operators Can Monetize 3G Investments Through an Effective Applications Platform," Texas Instruments, 2006, 10 pages.
Bainbridge, John, "A Secret Weapon", Nov. 17, 2011 jbainbridge Comments as featured in: sonicsinc.com/blog. Downloaded from http://www.sonicsinc.com/blog/?tag=axi, 2 pages.
International Search Report and Written Opinion for International Application No. PCT/US2016/036906, dated Sep. 7, 2016, 8 pages. International Searching Authority, c/o USPTO, Alexandria VA US.
Notification of Transmittal of the International Search Report and the Written Opinion of the International Searching Authority for International Patent Application No. PCT/US2016/036906, dated Dec. 21, 2017, 7 pages, International Searching Authority/US, Alexandria, Virginia, USA.

\* cited by examiner

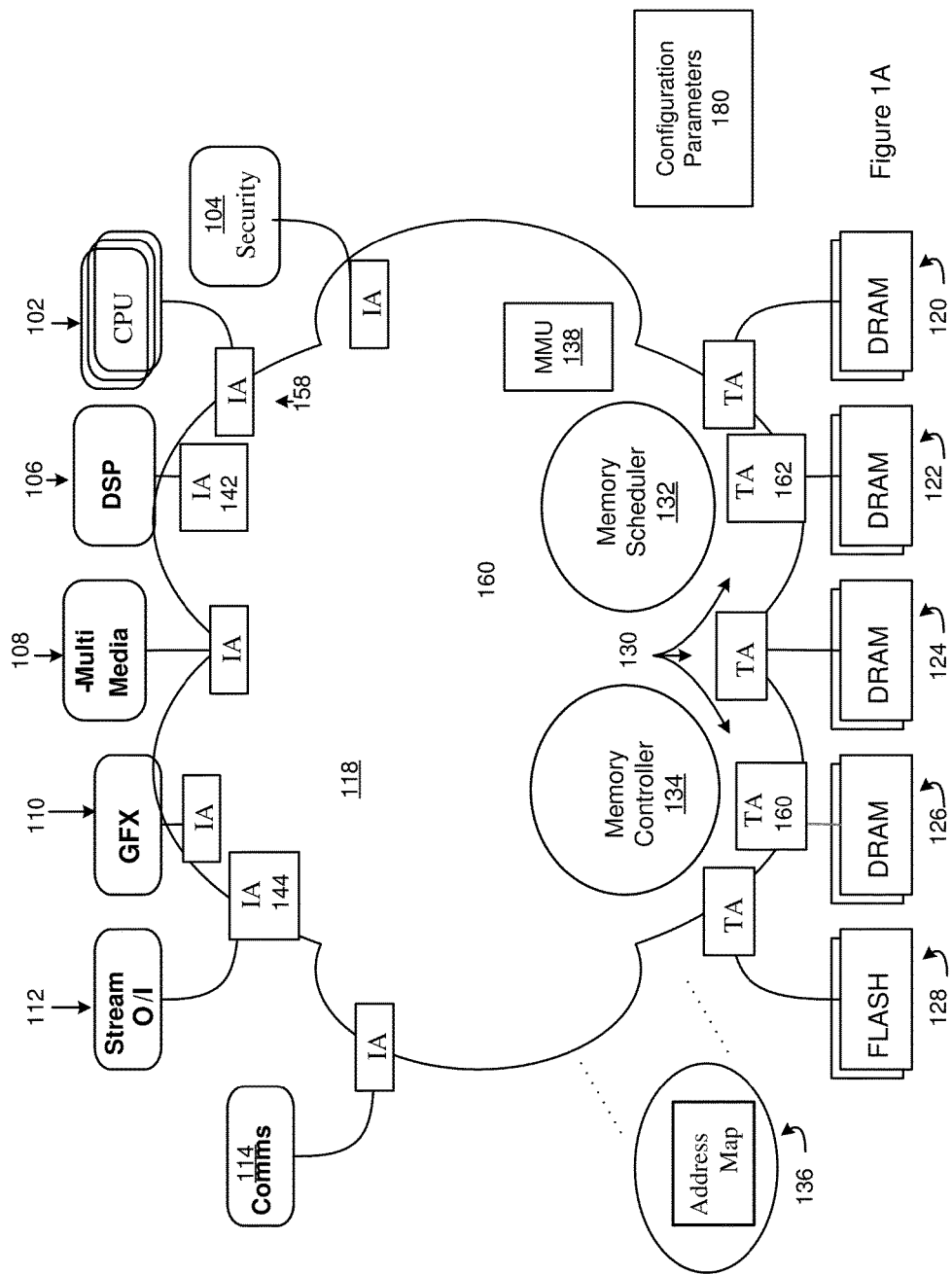

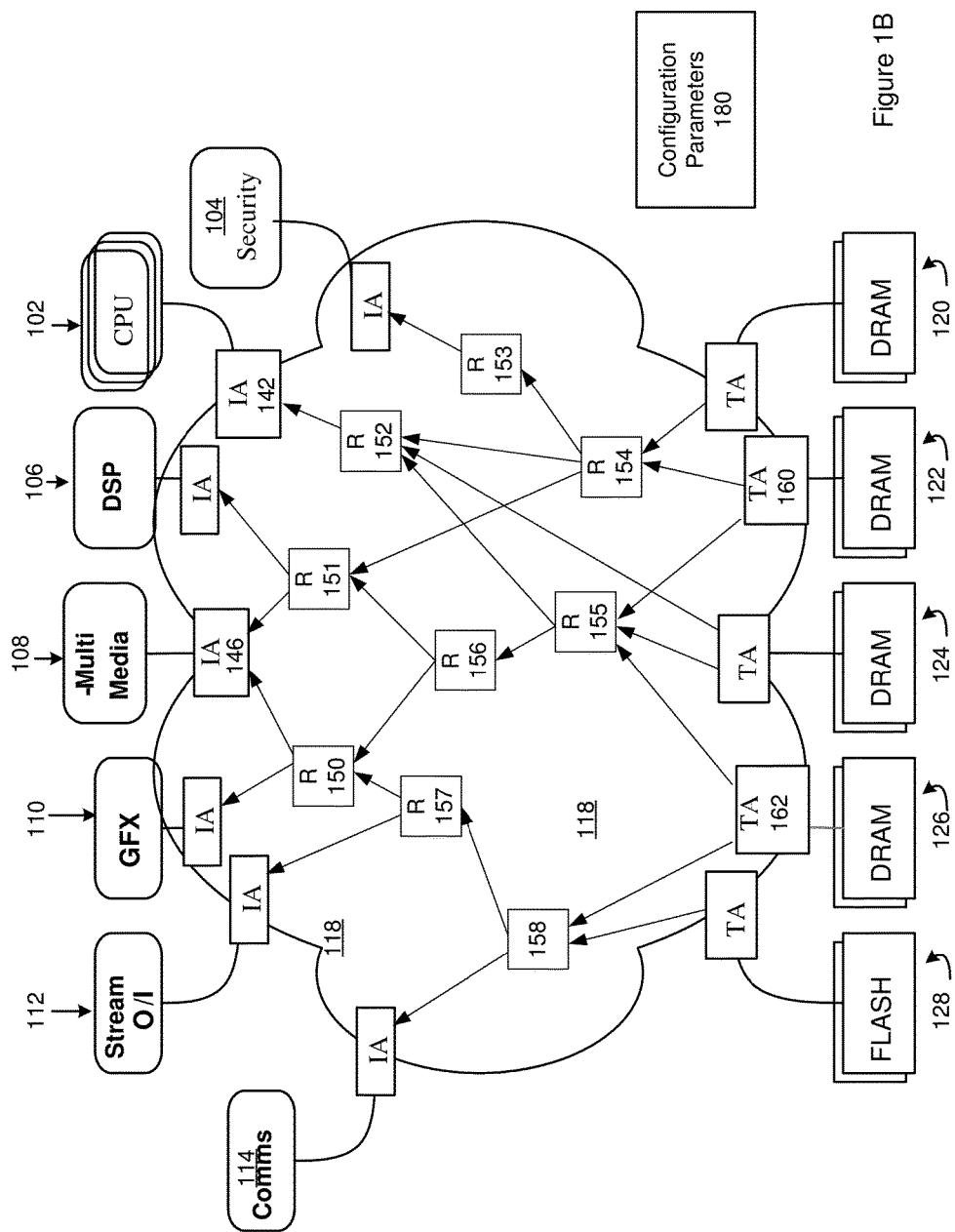

```
                                    ┌─────────┐
                                    │  Cont.  │
                                    └────┬────┘
                                         ▼
┌─────────────────────────────────────────────────────────────────────────┐
│    One or more of the of power-gated domains are simultaneously powered │
│ up from a lower power state of operation to a higher power state of operation. │
│  1376                                                                   │
└─────────────────────────────────┬───────────────────────────────────────┘
                                  ▼
┌─────────────────────────────────────────────────────────────────────────┐
│     The arbiter may delay in time the powering up of one or more power-gated │
│ domains relative to other power-gated domains in the set of power-gated domains │
│ to limit an amount of the different power domains simultaneously powering up to a │
│ maximum amount. The arbiter limits an amount of different power domains │
│ simultaneously powering up to be less than enough instantaneous electrical │
│ current drawn on the same voltage supply circuit to cause a reduction below a │
│ minimum allowable supply voltage level for the same voltage supply circuit. │
│  1378                                                                   │
└─────────────────────────────────┬───────────────────────────────────────┘
                                  ▼
┌─────────────────────────────────────────────────────────────────────────┐
│     The System on a Chip has two or more voltage supply sources each    │
│ supplying a different nominal voltage level, and where the two or more voltage │
│ supply sources may be arbitrated in parallel with each other.           │
│  1380                                                                   │
└─────────────────────────────────┬───────────────────────────────────────┘
                                  ▼
┌─────────────────────────────────────────────────────────────────────────┐
│ The power switch arbiter also considers additional aspects such as what priority is │
│ associated with a first domain in the set of power domains in a programmable │
│ relative domain priority scheme and/or whether a neighboring power domain is │
│ powering up, where credits are reserved for latency-sensitive domains to ensure │
│ they do not get blocked (to bound maximum power up response time)       │
│  1382                                                                   │
└─────────────────────────────────┬───────────────────────────────────────┘
                                  ▼
┌─────────────────────────────────────────────────────────────────────────┐
│ The power switch arbiter avoids power up starvation of domains via use of a │
│ round robin arbitration scheme.                                         │
│  1384                                                                   │
└─────────────────────────────────┬───────────────────────────────────────┘
                                  ▼
                               ┌──────┐
                               │ End  │
                               └──────┘
```

FIG. 13B

POWER MANAGER WITH A POWER SWITCH ARBITRATOR

RELATED APPLICATIONS

This application claims priority to and the benefit of Provisional Patent Application No. 62/173,851, titled, "Power Manager with a Power Switch Arbiter," filed Jun. 10, 2015 under 35 U.S.C. § 119, which is also herein incorporated by reference.

NOTICE OF COPYRIGHT

A portion of the disclosure of this patent document contains material that is subject to copyright protection. The copyright owner has no objection to the facsimile reproduction by anyone of the interconnect as it appears in the Patent and Trademark Office Patent file or records, but otherwise reserves all copyright rights whatsoever.

BACKGROUND OF THE INVENTION

A System-on-a-Chip design may have a need for lower power consumption, multiple clock domains, and multiple power domains. These domains enable power reduction by switching off local supplies to eliminate leakage current, dynamically scaling voltages and clocks (especially in processing subsystems such as CPUs, GPUs and video engines) to optimize active power for operating conditions and altering IP core clocks to meet the needs of application usage scenarios. Nonetheless, the integrated-circuit-system-power-manager turns different functional blocks on and off to achieve some of the above functions, the communications network between different functional blocks is typically left powered on while these other functional blocks are put into a sleep mode or idle state. Typically, the system-power-manager controls activity in power domains in order to turn off or power on a given power domain.

SUMMARY

Multiple example processes and apparatuses to provide a power switch arbiter that provides an optimal power switch turn on sequencing to reduce turn on delay in hardware in a high performance System on a Chip (SoC) are described. In an embodiment, a power switch arbitrator governs an arbitration between different power domains and a sequencing of powering up the different power domains supplied by the first voltage supply circuit on the System on a Chip.

The power switch arbitrator has arbitration logic to arbitrate multiple power domains at approximately the same time. The power switch arbitrator also has sequencing logic to limit an amount of the different power domains simultaneously powering up to a maximum amount, which is less than enough instantaneous electrical current drawn on the first voltage supply circuit to cause a reduction below a minimum allowable supply voltage level for the first voltage supply circuit.

The sequencing logic of the power switch arbiter is configured to provide the sequencing of powering up the different power domains that takes into account at least the following aspects. i) One or more reference tables or registers convey whether multiple power domains arbitrating to power up are part of a set of power domains that share a same voltage domain powered by the first voltage supply circuit, and/or ii) are powered from different voltage domains. ii) One or more reference tables or registers convey a first amount of an instantaneous electrical current drawn by a first power domain to power up as well as a second amount of instantaneous electrical current drawn by a second power domain from the first voltage supply circuit. The first amount of an instantaneous electrical current drawn by the first power domain to power up as well as a second amount of instantaneous electrical current drawn by the second power domain are both either 'factored into' or 'compared to' a power up domain credits value from a fourth reference table or register configured to convey a predicted maximum amount instantaneous electrical current draw from the first voltage supply circuit before a reduction occurs below the minimum allowable supply voltage level for the first voltage supply circuit. iii) A credit counter arrangement manages a total amount of instantaneous electrical currently being drawn from the first voltage supply circuit from any power domains at the time period of when the first power domain and second power domain submit their arbitration requests to power up.

The sequencing logic of the power switch arbiter controls a behavior of that power domain when powering up. The sequencing logic is configured to allow the first power domain and second power domain to power up at the same time at a non-restricted power up rate as long as the supplied amount of instantaneous electrical current from the first voltage supply circuit is low enough to not cause the drop in voltage level to below the minimum allowable supply voltage level for the first voltage supply circuit. The sequencing logic is configured, when the first and second power domains powering up at the same time at the non-restricted power up rate would predictably cause an excessive amount of instantaneous electrical current to be drawn that would cause the drop in voltage level to below the minimum allowable supply voltage level for the first voltage supply circuit, then the sequencing logic governs the power up sequencing to cause any one of the following three behaviors, based on programmed behaviors selected by a System on a Chip designer. i) The sequence logic delays in time sequentially waking up and powering up the second power domain after the first power domain so that a supply voltage level from the first voltage supply circuit does not drop below the minimum allowable supply voltage level for the first voltage supply circuit. ii) The sequence logic allows both the first and second power domains to power up, at the same time, at a limited electrical current draw rate set at an amount to not cause the drop in voltage level to below the minimum allowable supply voltage level for the first voltage supply circuit when all of the power domains in the set power up simultaneously. iii) The sequence logic allows the first power domain to power up at a substantially greater rate of charge than the second power domain for a staggered amount of time but a total draw of instantaneous electrical current between the first and second power domains powering up at the same time from the first voltage supply circuit will not cause the drop in voltage level to below the minimum allowable supply voltage level for the first voltage supply circuit.

BRIEF DESCRIPTION OF THE DRAWINGS

The multiple drawings refer to the embodiments of the invention.

FIG. 1A illustrates a block diagram of an embodiment of a System-on-a-Chip with SoC power management.

FIG. 1B illustrates a block diagram of an embodiment of an interconnect, for a System-on-a-Chip, with multiple routers with sequencing logic configured to reference a table or similar component, which is programmable by the System on a Chip designer, to include at least instantaneous electrical current draws of powering up each power domain, addresses of the power domains, and whether they neighbor each other.

FIGS. 13A and 13B illustrate an embodiment of a flow chart of one or more power switch arbiters managing a power up sequence.

Figure 2:
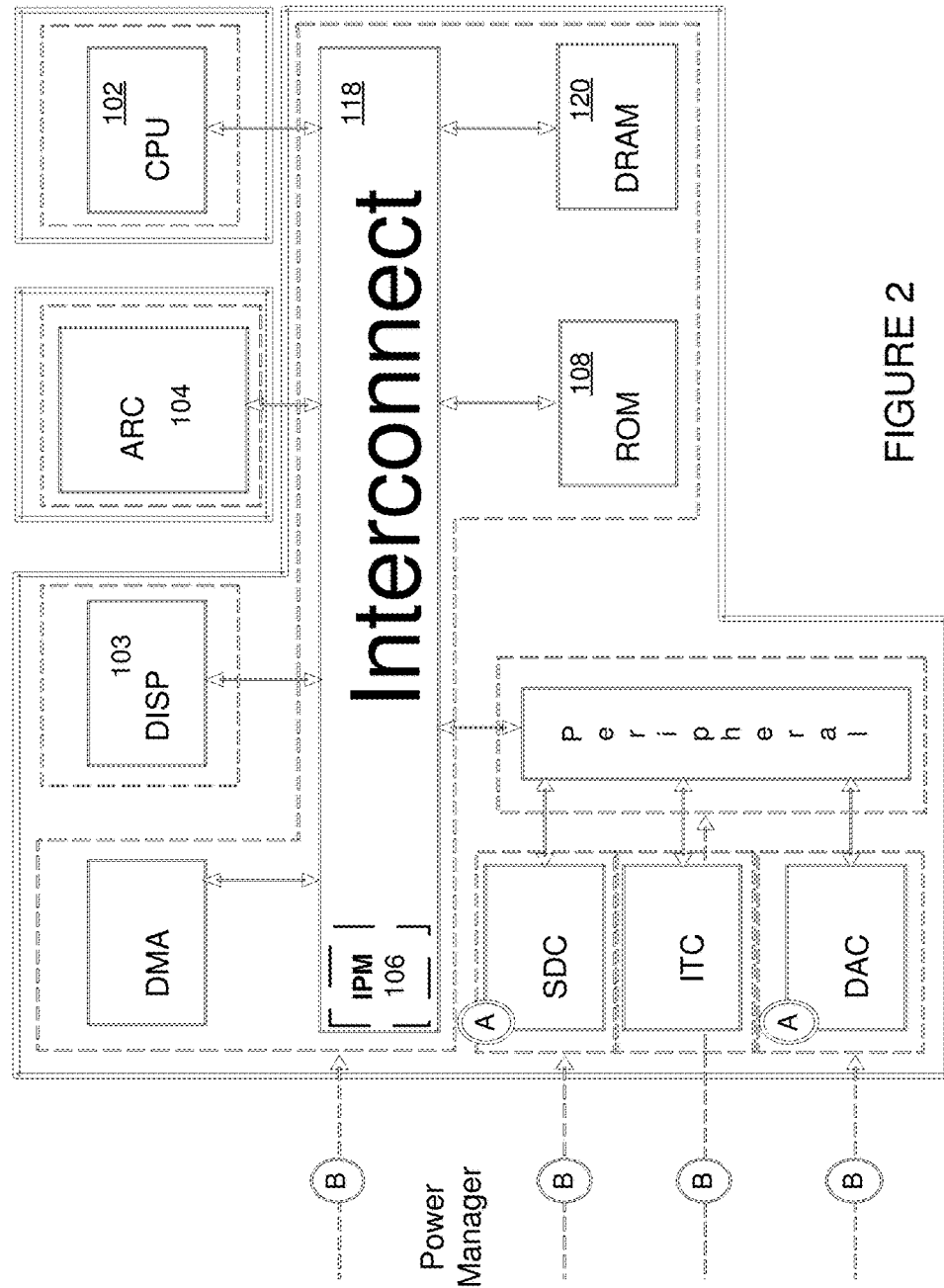
FIG. 2 illustrates a block diagram of an embodiment of a System-on-a-Chip having multiple initiator IP cores and multiple target IP cores that communicate transactions, such as read and write requests, burst requests, etc., as well as responses to those request transactions over the interconnect network and a power manager with one or more instances of power switch arbitrator to arbitrate and govern the power up sequences of the power domains of the initiator IP cores, multiple target IP cores and interconnect fabric.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific routines, named components, connections, types of IP cores, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Further specific numeric references, such as first circuit, may be made. However, the specific numeric reference should not be interpreted as a literal sequential order but rather interpreted that the first circuit is different than a second circuit. Thus, the specific details set forth are merely exemplary. The specific details may be varied from and still be contemplated to be within the spirit and scope of the present invention.

Multiple example processes of and apparatuses to provide a power switch arbiter that provides an optimal power switch turn on sequencing to reduce turn on delay in hardware in a high performance System on a Chip (SoC) are described. For example, various methods and apparatus associated with routing information from master/initiator cores (ICs) to slave target cores (TCs) through one or more routers in a System on a Chip (SoC) interconnect that takes into consideration the disparate nature and configurability of the ICs and TCs using the power switch arbiters are disclosed as example environments using these concepts.

In an embodiment, a set of power-gated domains on a System on a Chip use one or more power switch arbiters to produce a power up sequence for the set of power-gated domains all powered from the same voltage supply source for the System on a Chip. The set of power-gated domains, all powered from the same voltage supply source, arbitrate among themselves to receive the grant to power up. One or more but normally two or more power domains power up at the same time. In an embodiment, 5-100 power domains are powering up at the same time.

An amount of power-up domain credits is managed for each voltage supply source. Each voltage supply source has an assigned total amount of power-up domain credits in its credit pool. The sequencing logic in a power switch arbiter checks to see whether credits are available in the credit pool. Power-up domain credits are deducted from the supply pool at start of a power up for a power domain and credits are returned to the supply pool either i) when power up of the power domain is complete or ii) along the way to a complete power up as set thresholds are satisfied.

An amount of power-up domain credits for two or more power up behaviors for a given power domain are issued. In a first behavior, a greater amount of power-up domain credits are issued to allow a power domain to power up at a non-restricted charge rate from a lower state of operation, such as completely off. In a second behavior, a lower amount of power-up domain credits are issued to allow a power domain to power up from a higher power state of operation including but not limited to higher states of operation including a sleep state of operation, a memory contents retention state of operation, and other states where that power domain has not been completely powered off to an even higher power state of operation. In a third behavior, a lower amount of power-up domain credits are issued to allow a power domain to power up at a restricted charge rate for that power domain. In a fourth behavior, the arbiter may return a different number of credits than requested, which could indicate a need to power up more slowly at the restricted charge rate for that power domain. In a fifth behavior, the arbiter may delay in time the powering up of one or more power-gated domains relative to other power-gated domains in the set of power-gated domains to limit an amount of the different power domains simultaneously powering up to a maximum amount. In all behaviors, the arbiter limits an amount of different power domains simultaneously powering up to be less than enough instantaneous electrical current drawn on the first voltage supply circuit to cause a reduction below a minimum allowable supply voltage level for the first voltage supply circuit. Two or more of the power-gated domains are simultaneously powered up from a lower power state of operation to a higher power state of operation.

In an embodiment, the power switch arbitrator governs an arbitration between different power domains and sequences powering up the different power domains supplied by the first voltage supply circuit on the Chip. The arbitrator has sequencing logic that limits how many different power domains simultaneously power up to a maximum amount, which is less than enough instantaneous electrical current drawn on the first voltage supply circuit to cause a reduction below a minimum allowable supply voltage level for the first voltage supply circuit. The sequencing logic manages the sequencing of powering up the different power domains by factoring in i) whether different power domains arbitrating to power up are part of a set of power domains that share the first voltage supply circuit, ii) an amount of an instantaneous electrical current drawn from all of the power domains in the process of powering up, and iii) an amount of credits available before the minimum allowable supply voltage level occurs for that first voltage supply circuit. The sequencing logic controls a behavior of the power domains when powering up from any of a number of different behaviors.

The following drawings and text describe various example implementations of the design.

FIGS. 1A, 1B, 2, and 3 show example SoCs where the power manager with one or more power switch arbiters may be utilized.

Figure 4:
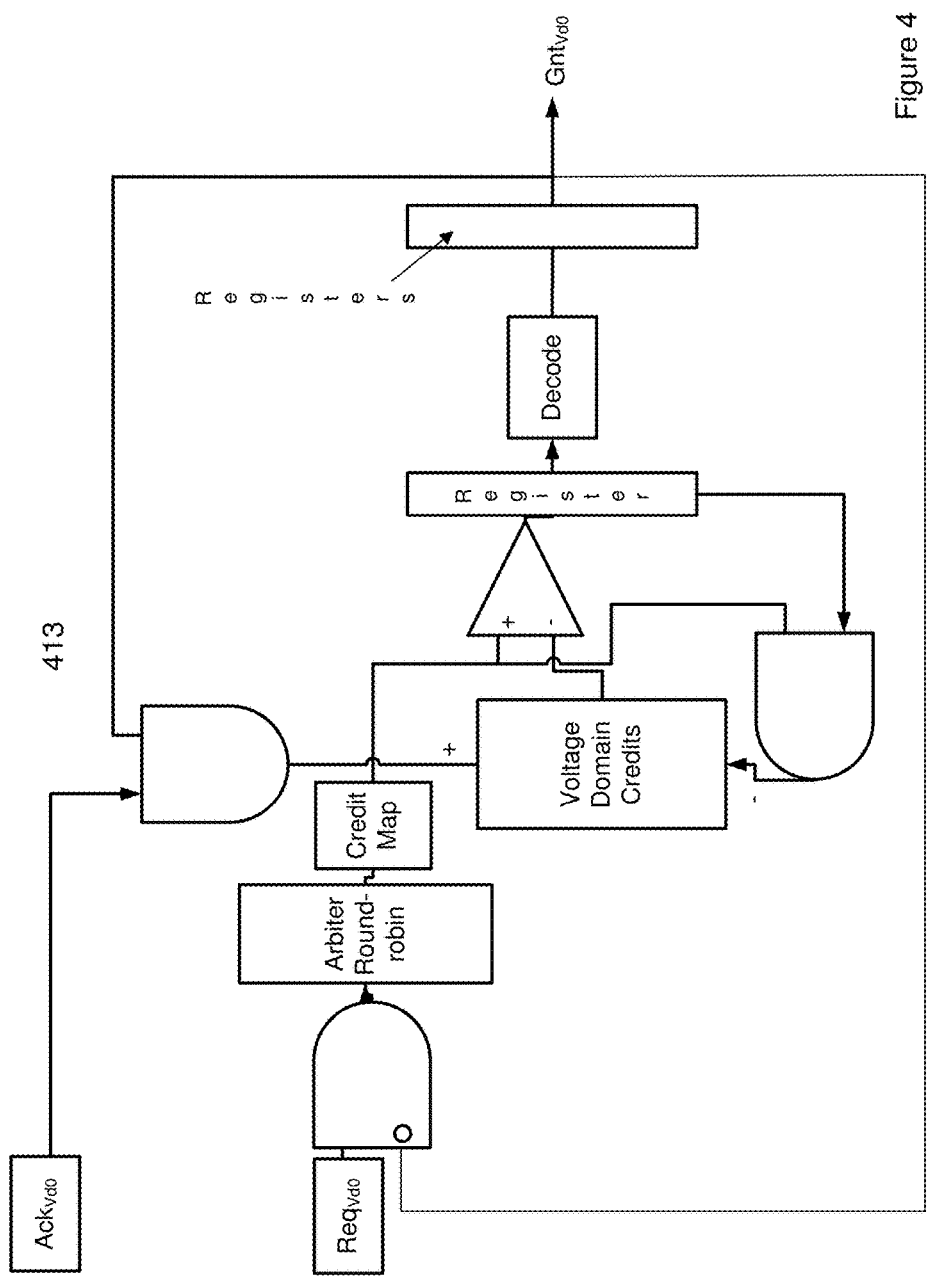
FIG. 4 illustrates a block diagram of a power switch arbitrator configured to govern an arbitration between different power domains and a sequencing of powering up the different power domains supplied by the first voltage supply circuit on the System on a Chip.

FIG. 4 illustrates a block diagram of a power switch arbitrator configured to govern an arbitration between different power domains and a sequencing of powering up the different power domains supplied by the same voltage supply circuit on the System on a Chip.

The power switch arbitrator 413 has arbitration logic to arbitrate at approximately the same time. The multiple power domains within a same set of power domains are all able to send arbitration requests at the same time. Each power domain set may have its own instance of the power switch arbitrator 413 and arbitrate at approximately the same time. The different instances of the power switch arbitrator 413 may communicate with each other regarding arbitration issues.

The power switch arbitrator 413 also has sequencing logic to limit an amount of the different power domains simultaneously powering up to a maximum amount, which is less than enough instantaneous electrical current drawn on the same voltage supply circuit to cause a reduction below a minimum allowable supply voltage level for the same voltage supply circuit.

The sequencing logic of the power switch arbiter is configured to provide the sequencing of powering up the different power domains that takes into account at least the following aspects of i) a first reference table or register configured to convey whether multiple power domains arbitrating to power up i) are part of a set of power domains that share a same voltage domain powered by the same voltage supply circuit, and/or ii) are powered from different voltage domains;

ii) a second reference table or register configured to convey a first amount of an instantaneous electrical current drawn by a first power domain to power up as well as a third reference table or register configured to convey a second amount of instantaneous electrical current drawn by a second power domain from the same voltage supply circuit. The amount of instantaneous electrical current drawn by all of the power domains currently attempting to power up are either 'factored into' or 'compared to' a power up domain credits value from a fourth reference table or register configured to convey a predicted maximum amount instantaneous electrical current draw from the same voltage supply circuit before a reduction occurs below the minimum allowable supply voltage level for the same voltage supply circuit; and iii) a credit counter arrangement, in the credit map or voltage domain credit block, configured to manage a total amount of instantaneous electrical currently being drawn from the same voltage supply circuit from any power domains at the time period of when the first power domain and second power domain submit their arbitration requests to power up; and iv) logic with an algorithm to look at the above aspects and send a signal to the arbitration logic on which one or more power domains within a set can power up at the same time.

The power switch arbiter uses a series of masking logic, arbiters and credit counters to implement a complex solution with minimal hardware.

The power switch arbiter manages the simultaneous turn on of power switches connected to the same voltage source. The problem this solves is when multiple power switches turn on at the same time the VDD or VSS rails may experience some voltage sags. These voltage sags can cause a failure in the power domains attempting to power up as well as potentially in neighboring logic that is still operating. To solve this we need to stagger the turn on of these switches across power domains. The power switch arbiter may offer the feature of accepting in requests from each power domain connected to the same voltage supply. This could be, for example, 5 to a 100 requests from power domains in that set requesting to power up. Each request can indicate how much load it requires such that it can power up from a retention state with less voltage resources.

The power switch arbiter provides an optimal power switch turn on sequencing to reduce turn on delay in hardware. The power switch arbiter takes into account at least these aspects: Switches/transistors sharing the same voltage domain (interaction between different voltage domains can be optimized); the size of the voltage domain to turn on (smaller domains can be turned on at the same time); and potentially, the power domain's physical location to other power domains (domains on different voltage sources can still have a physical location effect on each other).

The sequencing logic is configured to allow the power domains to have different power up behaviors. The sequencing logic is configured to allow the first power domain and second power domain to power up at the same time at a non-restricted power up rate as long as the supplied amount of instantaneous electrical current from the same voltage supply circuit is low enough to not cause the drop in voltage level to below the minimum allowable supply voltage level for the same voltage supply circuit. Alternatively, when the first and second power domains powering up at the same time at the non-restricted power up rate would predictably cause an excessive amount of instantaneous electrical current to be drawn that would cause the drop in voltage level to below the minimum allowable supply voltage level for the same voltage supply circuit, then the sequencing logic governs the power up sequencing to cause any one of the following three additional behaviors, based on programmed behaviors selected by a System on a Chip designer:

i) The sequence logic delays in time sequentially waking up and powering up the second power domain after the first power domain so that a supply voltage level from the same voltage supply circuit does not drop below the minimum allowable supply voltage level for the same voltage supply circuit. Thus, the power switch arbiter allows a variable delay between every switch being turned on verses always needing a worse case set fixed delay between turning on electrical components in the power domains. Accordingly, the power switch arbiter allows power domains to become active more quickly than a solution that only allows multiple power domains to wake up at the same time but each domain is supplied a bare minimum amount of electrical current to ensure no possibility ever exists to cause allow enough electrical current to flow to cause a drop in voltage supply level. or ii) The sequence logic allows both the first and second power domains in this same set to power up, at the same time, at a limited electrical current draw rate set at an amount to not cause the drop in voltage level to below the minimum allowable supply voltage level for the same voltage supply circuit when all of the power domains in the set power up simultaneously. or iii) The sequence logic allows the first power domain to power up at a substantially greater rate of charge than the second power domain for a staggered amount of time but a total draw of instantaneous electrical current between the first and second power domains powering up at the same time from the same voltage supply circuit will not cause the drop in voltage level to below the minimum allowable supply voltage level for the same voltage supply circuit. Thus, the power switch arbiter allows SoC designer to not have to over-design the layout to handle the worst case scenario of turning on of all power domains in the SoC in the same period of time, in every instance. Instead, the power switch arbiter allows power domains to become active more quickly than this worst case scenario that only allows multiple power domains to wake up at the same time but each domain is supplied a bare minimum amount of electrical current to ensure no possibility ever exists to cause allow enough electrical current to flow to cause a drop in voltage supply level.

Also, at the time of the arbitration of the first and second power domains, zero other power domains and/or many other power domains may be affecting the total amount of instantaneous electrical currently being drawn from the same voltage supply circuit.

Each instance of the power switch arbiter may have a behavior register for the sequencing logic to reference (see, for example, programmable behavior configuration register 180 in FIGS. 1A and 1B). The behavior register is programmable by the System-on-a-Chip designer to convey a desired behavior for the power up sequencing for the set of power domains, based on programmed behaviors selected by the System-on-a-Chip designer in the behavior register.

In a first behavior, a greater amount of power-up domain credits are issued to allow a power domain to power up at a non-restricted charge rate from a lower state of operation, such as completely off. In a second behavior, a lower amount of power-up domain credits are issued to allow a power domain to power up from a higher power state of operation including but not limited to higher states of operation including a sleep state of operation, a memory contents retention state of operation, and other states where that power domain has not been completely powered off to an even higher power state of operation. In a third behavior, a lower amount of power-up domain credits are issued to allow a power domain to power up at a restricted charge rate for that power domain. In a fourth behavior, the arbiter may return a different number of credits than requested, which could indicate a need to power up more slowly at the restricted charge rate for that power domain. In a fifth behavior, the arbiter may delay in time the powering up of one or more power-gated domains relative to other power-gated domains in the set of power-gated domains to limit an amount of the different power domains simultaneously powering up to a maximum amount. In all behaviors, the arbiter limits an amount of different power domains simultaneously powering up to be less than enough instantaneous electrical current drawn on the first voltage supply circuit to cause a reduction below a minimum allowable supply voltage level for the first voltage supply circuit.

In an embodiment, the selected behavior can have any combination of the above behaviors for the power domains. In an embodiment, the selected behavior can have any single one of the above behavior for the power domains in the set of power domains of the sequence logic delays in time sequentially waking up and powering up the second power domain after the first power domain so that a supply voltage level from the same voltage supply circuit does not drop below the minimum allowable supply voltage level for the same voltage supply circuit.

The power switch arbiter allows less overhead in the layout by not having to support maximum simultaneous power switch turn on events.

The power switch arbitrator 413 allows different power domains to try to power up and arbitrate for powering up approximately the same time. The power switch arbitrator 413 is configured with logic to prevent too many of the power domains in an SOC from trying to power up at the same time and draw a large amount of electrical current, which would then cause a reduction in the supply voltage level. For example, a momentary decrease in supply voltage level from 1.1 V to 0.9 V may occur when an excessive amount of electrical current is drawn from a given voltage regulating circuit on the SoC.

Upon power up, the power supply source must supply enough current to re-charge the substrate/well and internal nodes of each of the power domain's circuitry (assuming worse case that the circuitry has had enough time to discharge charge down to ground potential via leakage). Also, a power supply's capacity factors in when too many existing circuits/power domains draw on the same VDD that can cause a voltage supply droop, which occurs as a result of the peak current draw, and not the total charge needed. Both not enough charge available or too much peak current drawn at a given moment in time can both be generalized as a need of an excessive amount of electric current to be drawn. Note, instantaneous electrical current is defined herein to convey 'peak electrical current' OR 'total charge'—a spike of electrical current multiplied by its time duration as an electric circuit powers up from a lower power state of operation' as both convey a semantically similar concept to one skilled in the art.

Thus, the power switch arbitrator 413 is configured to merely allow only up to a maximum number of power domains to wake up and power up at any given time. The maximum number of power domains allowed to wake up or power up at any given time will be below the amount which would cause an excessive amount of electric current to be drawn and then would incur a supply voltage level to drop. Various current models and equations can project when an excessive amount of electric current will be drawn and then would incur a supply voltage level to drop below the minimum allowable supply voltage level for the same voltage supply circuit. The amount of power domains that would actually cause an excessive amount of current to be drawn, would then be spaced in time to be sequentially woken up and powered up so that a voltage supply level does not drop below the minimum. Alternatively, the current drawn by power domains may be limited in different manners to power up so that a voltage supply level does not drop below the minimum. The power switch arbitrator 413 governs this arbitration between domains and the sequencing of powering up the power domains. Various algorithms can be employed by the power switch arbitrator to take in the factors of peak electrical current and total charge to ensure the voltage does not go below the minimum.

Note, a timer circuit can track when one or more power domains in the set of different power domains supplied by the same voltage supply circuit are in a state of powering up. Thus, the timer circuit in essence tracks a summation of instantaneous electrical current draws over time from the different power domains in the set, which a total summation of electrical current draws that could affect supply voltage droop and cause the drop in the voltage level from the same voltage supply circuit to below the minimum allowable supply voltage level for the same voltage supply circuit. The timer circuit is configured to supply a feedback signal to affect the power up domain credits value from the fourth reference table or register in the credit map that conveys the predicted maximum amount instantaneous electrical current draw from the same voltage supply circuit before the reduction occurs below the minimum allowable supply voltage level for the same voltage supply circuit. Note, timer circuit allows the power up demand credits to adequately and accurately cover both situations where peak electrical current reflects an instantaneously current surge and where the summation of current charge draws over time from the different domains can cause the drop in supply voltage.

Also, one or more event monitors can be located on an interface of each power domain. Each event monitor is configured to detect if that power domain has completely powered up and then convey an activity signal to the domain credit counter arrangement block configured to convey the predicted total amount of instantaneous electrical currently being drawn from the same voltage supply circuit from any other power domains at the time period of when the multiple power domains submit their arbitration requests to power up, so that this can then be used to generate signal to free up credits.

Figure 5:
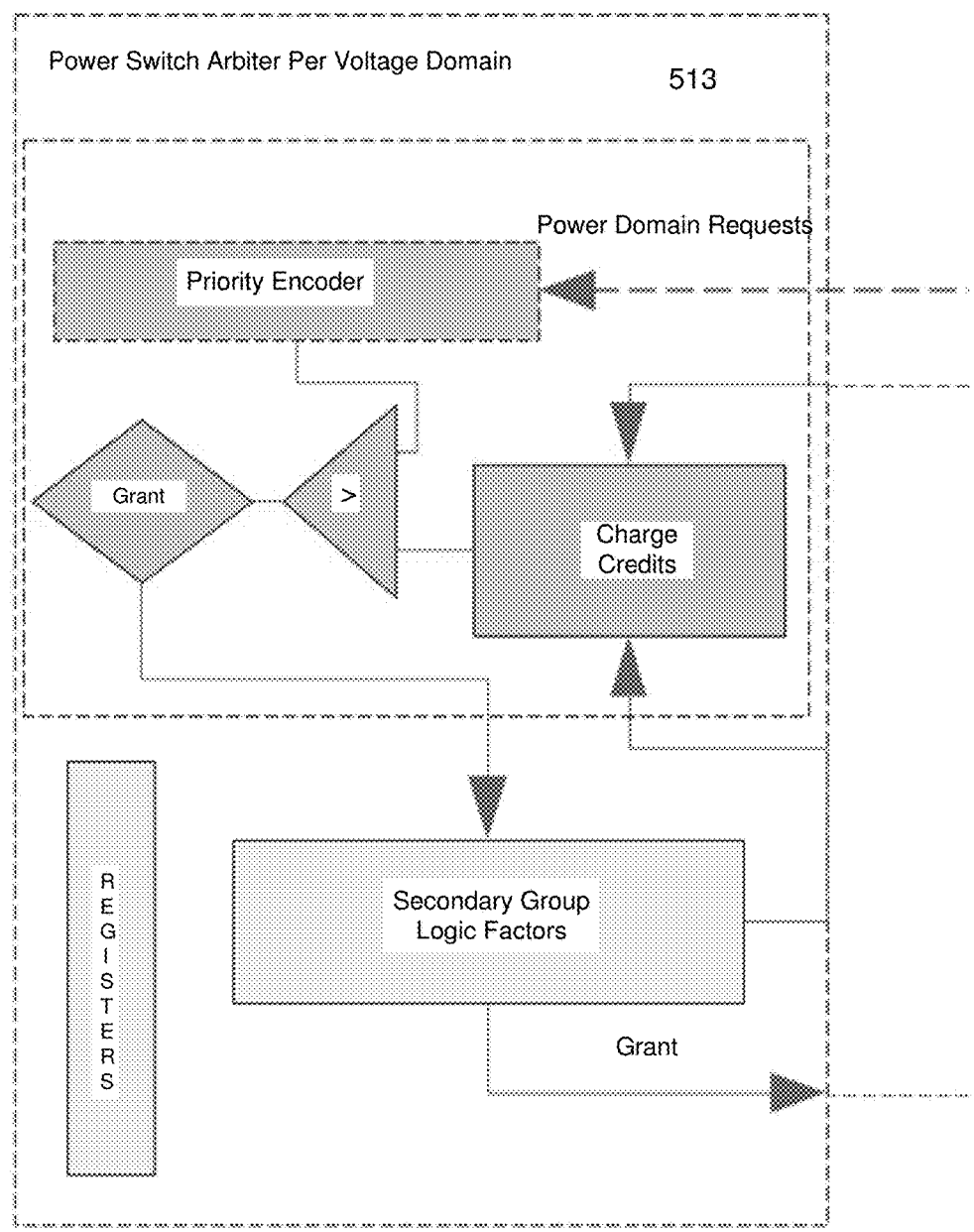
FIG. 5 illustrates a block diagram of a power switch arbitrator configured to consider what priority is associated with one or more of the domains in the set of power domains.
Figure 6:
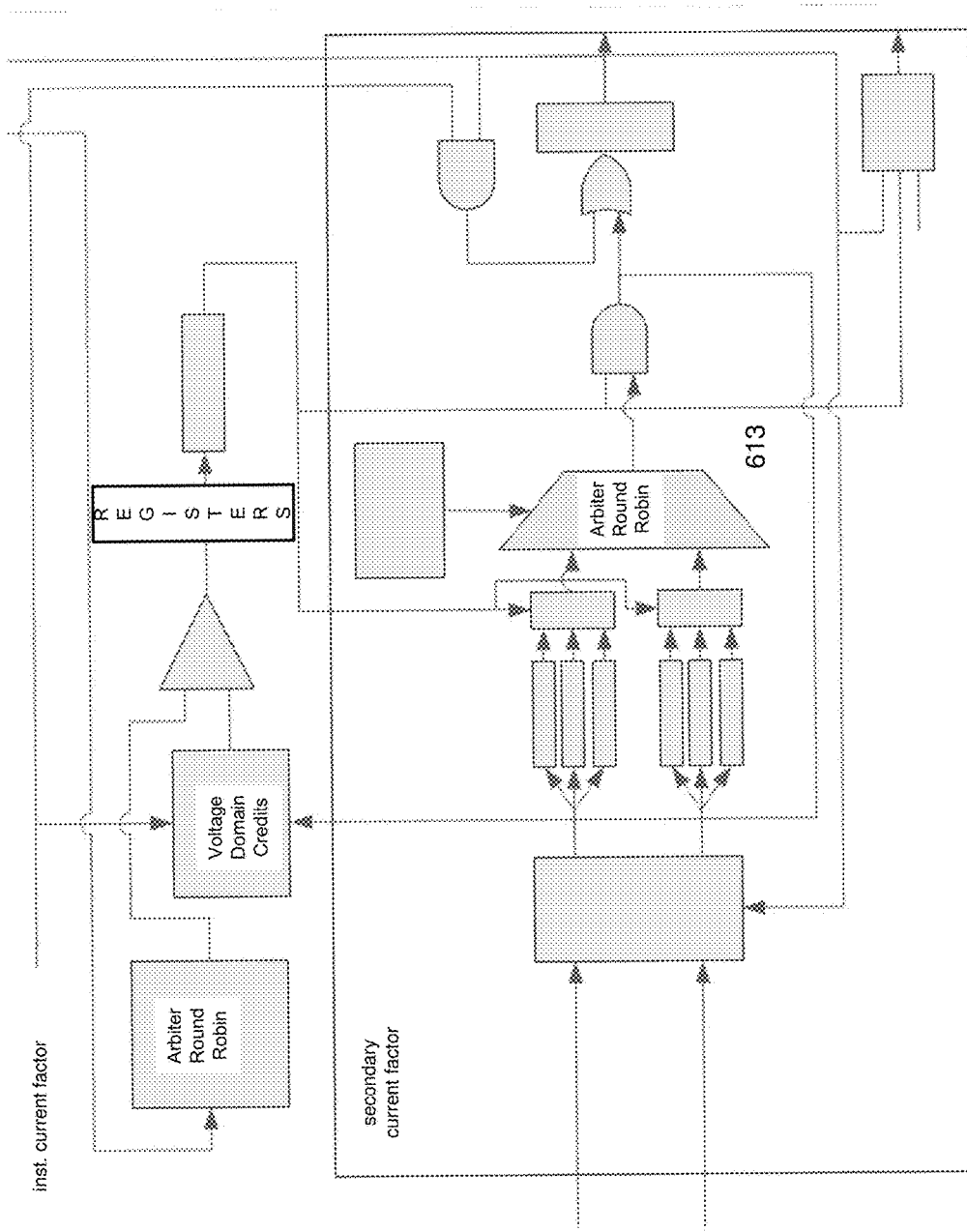
FIG. 6 illustrates a block diagram of a power switch arbitrator configured to avoid power up starvation of power domains in the set via use of a round robin arbitration scheme.
Figure 8:
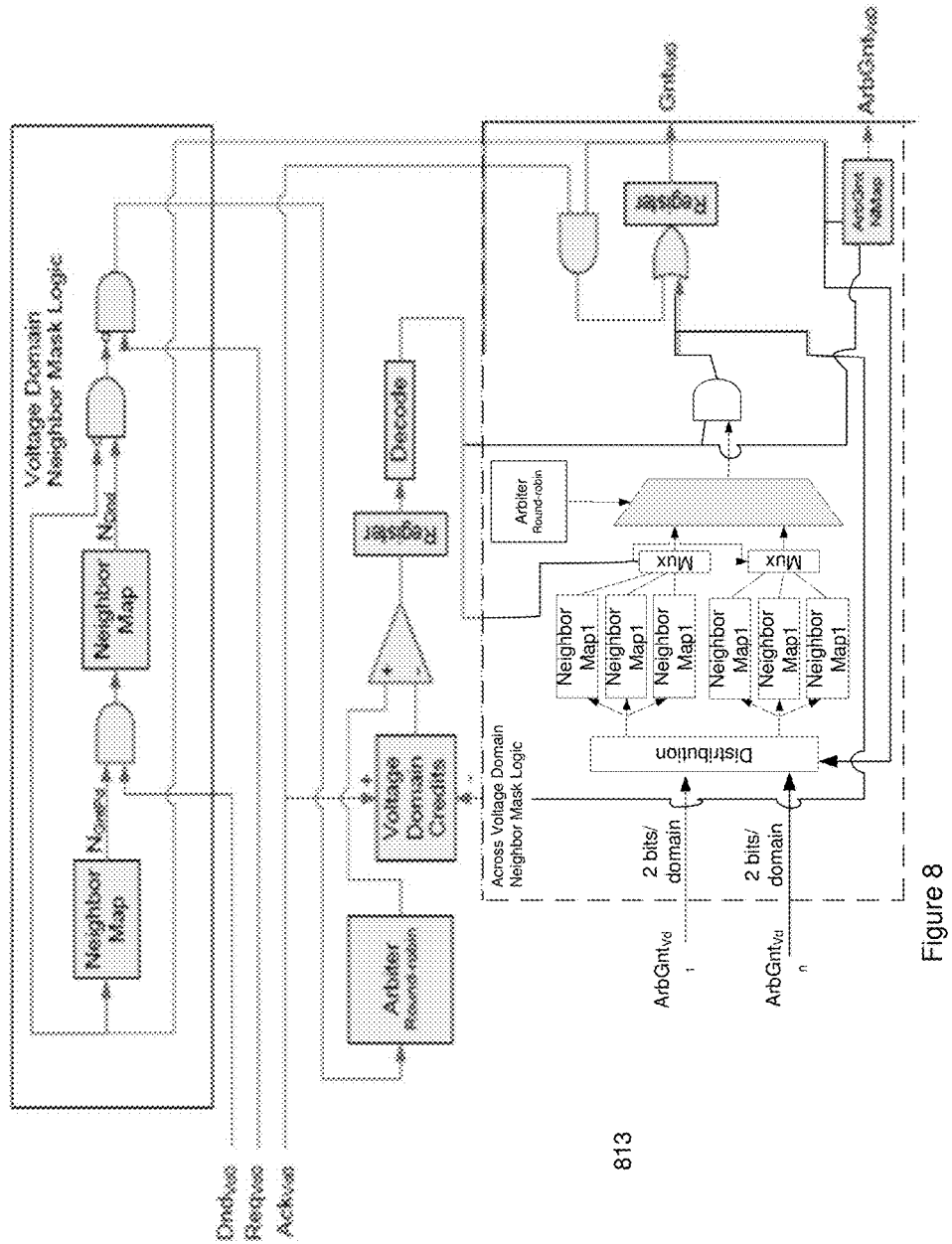
FIG. 8 illustrates an example block diagram of a power switch arbitrator with the sequencing logic is configured to take into account both instantaneous electrical current as well as an additional aspect that has its own set of power domains that have that additional aspect in common.

FIG. 4 illustrates a power switch arbiter with logic factoring in instantaneous electrical current drawn. FIG. 6 has a power switch arbiter with logic factoring in instantaneous electrical current drawn and secondary electrical current factors. FIG. 8 has a power switch arbiter with logic factoring in instantaneous electrical current drawn and the secondary factor of specifically neighboring logic. FIG. 5 has a power switch arbiter with logic factoring in what priority is associated with one or more of the domains in the set of power domains.

The power switch arbiter 513 may also have additional circuitry to consider what priority is associated with one or more of the domains in the set of power domains in a programmable relative priority scheme (See FIG. 5). FIG. 5 illustrates a block diagram of a power switch arbitrator 513 configured to consider what priority is associated with one or more of the domains in the set of power domains. Power up domain credits could be reserved for latency-sensitive domains to ensure they do not get blocked (to bound maximum power up response time).

Referring to FIG. 6, the power switch arbiter 613 can avoid power up starvation of power domains in the set via use of an arbitration scheme (See FIG. 6). FIG. 6 illustrates a block diagram of a power switch arbitrator 613 configured to avoid power up starvation of power domains in the set via use of a round robin arbitration scheme. The round-robin arbiters can work on a token basis. Therefore, the last guy granted has the token to give away in the next cycle to the requestor that is the closest in a predetermined circle. If no one is requesting the last guy granted holds on to the token for the next cycle. The power switch arbitrator 613 can use some look-ahead logic within the arbiter to check for group of say four requestors at a time to minimize the arbiter delay.

Figure 7:
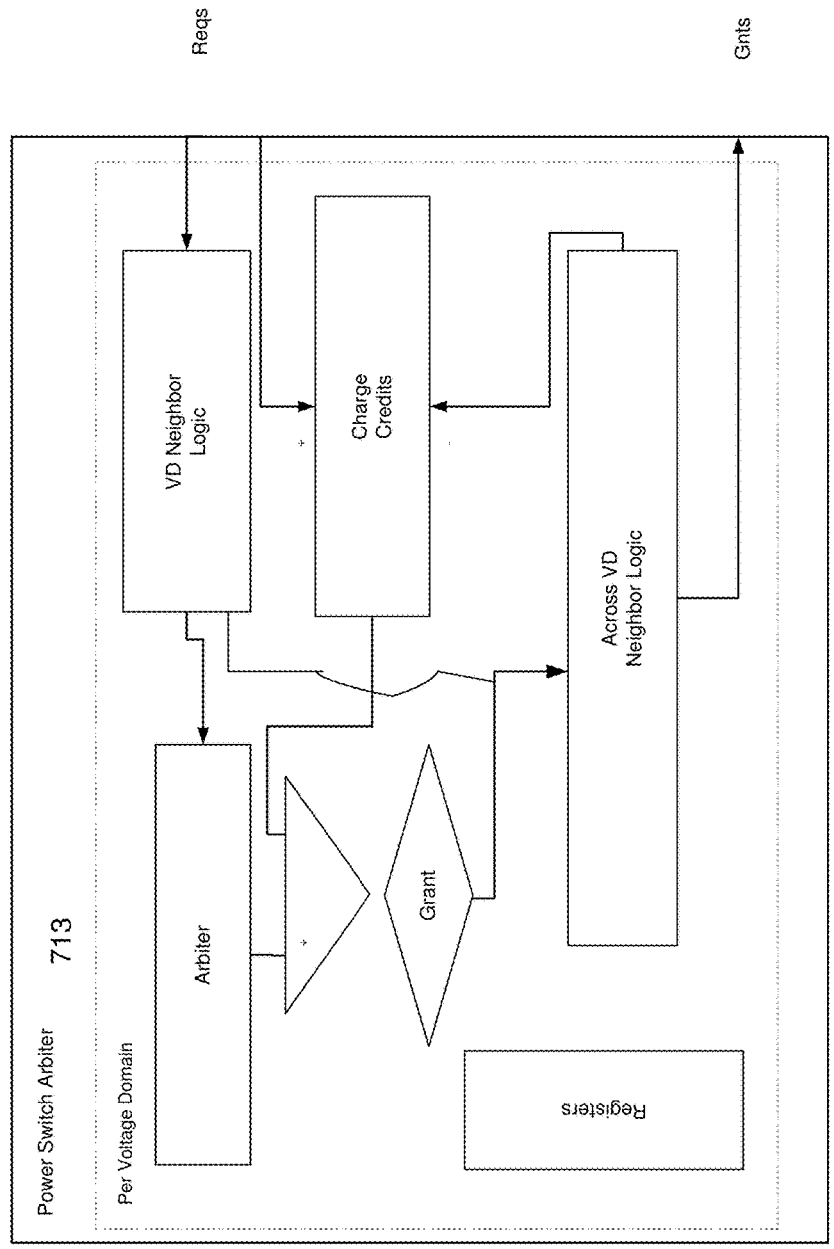
FIG. 7 illustrates an example block diagram of a power switch arbitrator configured to factor in both of these conditions 1) the total amount of instantaneous electrical current draw of power domains in the set of power domains that share the first voltage supply circuit wanting to be powered up at substantially a same point in time, and 2) an amount of neighboring power domains sharing a common resource with any of the power domains in the set that share the first voltage supply circuit, when those neighboring power domains are in a state of powering up.

FIG. 7 illustrates an example block diagram of a power switch arbitrator configured to factor in both of these conditions 1) an amount of neighboring power domains sharing a common resource with any of the power domains in the set that share the first voltage supply circuit, when those neighboring power domains are in a state of powering up, and 2) the total amount of instantaneous electrical current draw of power domains in the set of power domains that share the first voltage supply circuit wanting to be powered up at substantially a same point in time. The power switch arbiter 713 is split into two parts. The first part is per voltage domain and provides zero or one grants with neighbor logic arbitration within the same voltage domain. The second part combines these grants together with the information on neighbors across voltage domains.

Again, the power switch arbitrator is configured to merely allow only up to a maximum number of power domains to power up at any given time. The maximum number of power domains allowed to power up at any given time will be below the amount which would cause an excessive amount of electric current to be drawn and then would incur a supply voltage level to drop. A similar electrical voltage droop effect may occur when too many power domains within a set group all draw from the same power source to cause the effective supply voltage level to become smaller when referenced to the electrical ground voltage of the SoC. Neighboring power domains in the System on a Chip typically share a common electrical ground bus or wire. Thus, when two or more neighboring powering domains wake up and power up at same time, then a large current surge may cause the electrical ground wire shared by the neighboring power domains to momentarily change its reference voltage level. The momentary increase in voltage level of the electrical ground on that section of the SoC may have the same effect as the supply voltage level of the electrical voltage regulating circuit power circuit dropping off.

An additional aspect algorithm employed by the power switch arbitrator factors in both of these conditions 1) an amount of neighboring power domains sharing a common resource, such as a ground wire, and 2) the total amount of power domains wanting to be powered up at substantially a same point in time. The additional aspect algorithm may be a combination of hardware logic and software coding. Thus, the sequencing logic can be configured to take into account both instantaneous electrical current as well as an additional aspect, such a group of neighboring power domains, that has its own set of power domains that have that additional aspect in common, which then that additional aspect of the power domain is taken into account for arbitrating power up requests from all of the power domains on a system of a chip.

The power switch arbitrator allows the creation of more power domains and smaller power domains on a SoC because it takes into account the two factors of i) additional aspects, such as neighboring power domains that share a common resource, such as a ground wire, and ii) the total amount of power domains attempting to power up during the same time period.

In an embodiment, the sequencing logic also takes into account at least the following aspect of geography of the power domain arbitrating to power up relative to a physical location of other power domains arbitrating to power up at approximately same time; and thus, a tailored additional aspect algorithm employed by the sequencing logic of the power switch arbitrator factors in both of these conditions 1) an amount of neighboring power domains sharing a common resource with any of the power domains in the set that share the same voltage supply circuit, when those neighboring power domains are in a state of powering up, and 2) the total amount of instantaneous electrical current draw of power domains in the set of power domains that share the same voltage supply circuit wanting to be powered up at substantially a same point in time.

In general, the sequencing logic is configured to reference a table or similar component, which is programmable by the System on a Chip designer, to include at least instantaneous electrical current draws of powering up each power domain, addresses of the power domains, and whether they neighbor each other.

An implementation only allows 1 power domain per voltage domain to turn on per clock cycle with neighbor logic across voltage domains able to disable a power domain from turning on if there is a situation where multiple domains are turning on.

The power switch arbiter 713 may be a hardware implementable solution for protecting the operating power domains including but not limited to: multiple power domains connected to the same supply; method to estimate the effect of a domain turn on power domains connected to the same voltage domain; and multiple power domains that are physical neighbors.

The power switch arbiter 713 acts as a system to prevent too many power domains from switching on at the same time. Neighbor logic of the power switch arbiter 713 can prevent two adjacent domains from powering on if required.

FIG. 8 illustrates an example block diagram of a power switch arbitrator with the sequencing logic is configured to take into account both instantaneous electrical current as well as an additional aspect that has its own set of power domains that have that additional aspect in common. Again, the top half of a power switch arbitrator 813 is within a voltage domain and has some neighbor mask logic, which takes the incoming requests and masks off these requests which are neighbors to a domain which is currently on (DND=do not disturb) and have a currently transitioning neighbor. These masked requests then go into an arbiter which will pick 1 winner based on a round robin arbiter. The result of the arbiter will choose a single request winner, this winner will be compared to a voltage domain credit counter to see if the given request can be allowed to move to the next phase. If the credits are too few then no request will be moved to the next phase.

The bottom half of the power switch arbitrator 813 will take in the pending power domain request winners from each voltage domain and use it as a selector into the neighbor mux to choose the proper neighbor map 1 logic. The second arbiter is also round-robin and is maintained across all the voltage domains to keep all these arbiters in sync. The ArbGnt signaling is a 2 bit per power domain to define if this domain is: off; on; on with a neighbor in transition; or on with a neighbor requesting transition.

Figure 10:
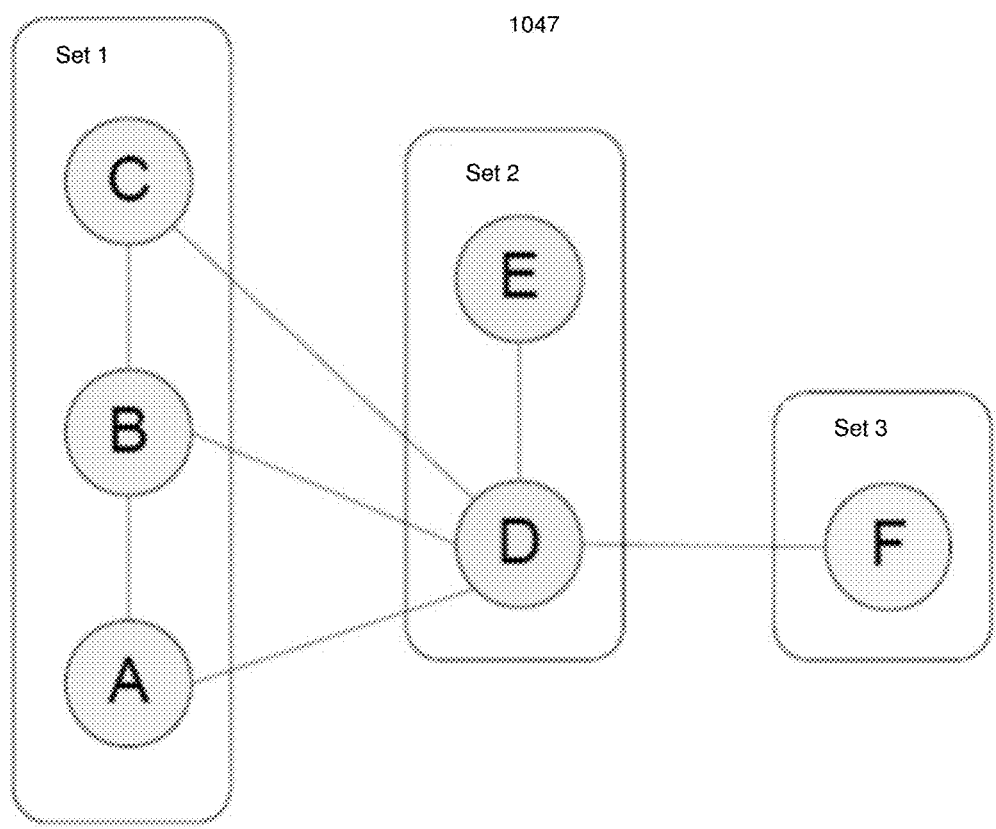
FIG. 10 illustrates an example diagram reflecting 3 voltage domains: Sets 1, 2 and 3.

FIG. 10 illustrates an example table reflecting 3 voltage domains: Sets 1, 2 and 3 and an example set of components within that power domain. Voltage domain Set 1 contains three power domains A, B, and C. Voltage domain Set 2 contains power domains D and E. Voltage domain Set 3 contains power domain F. The lines indicate which domains are considered to be neighbors.

EXAMPLES

Let us run through a few examples of cross domain issue given this neighbor map 1047 with 3 voltage domains: Set 1, Set 2, and Set 3. The circles represent power domains. Below are the cases that show the possible dependencies across voltage domains where power domain A will get denied a grant if a competing domain is already transitioning or will require arbitration if the competing domain is also requesting.

Case 1—A-requesting, D-DND, B-PSO, C-Transitioning
Case 2—A-requesting, D-DND, E-Requesting
Case 3—A-requesting, D-DND, E-Transitioning
Case 4—A-requesting, D-DND, F-Requesting
Case 5—A-requesting, D-DND, F-Transitioning
Case 6—A-requesting, D-Transitioning, B-DND
Case 7—A-requesting, D-Requesting, B-DND Note, not covered above are the cases within a voltage domain, as these are pretty straight forward. All the neighbors of a DND block may not have more than one power domain in transition at the same time.

Figure 11:
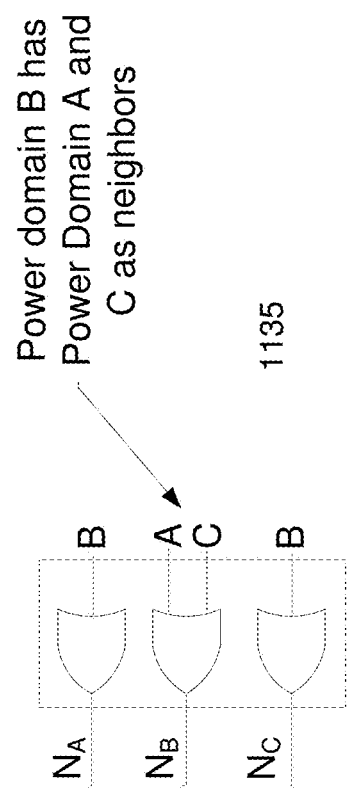
FIG. 11 shows a logic diagram of an embodiment of sequencing logic configured to take into account an additional aspect that one or more of its own set of power domains have in common with other power domains such as a neighbor map.

FIG. 11 shows a logic diagram of an embodiment of sequencing logic configured to take into account an additional aspect that one or more of its own set of power domains have in common with other power domains, such as a neighbor map. The neighbor map logic 1135 may be a series of OR gates, or similar Boolean logic circuit, which has the neighbor map for each power domain within the same voltage domain. So power domain A will have all of its neighbor power domains ORed together, in this example it is just power domain B. Then power domain B will have all of its neighbor power domains ORed together, in this example is A and C.

Figure 12:
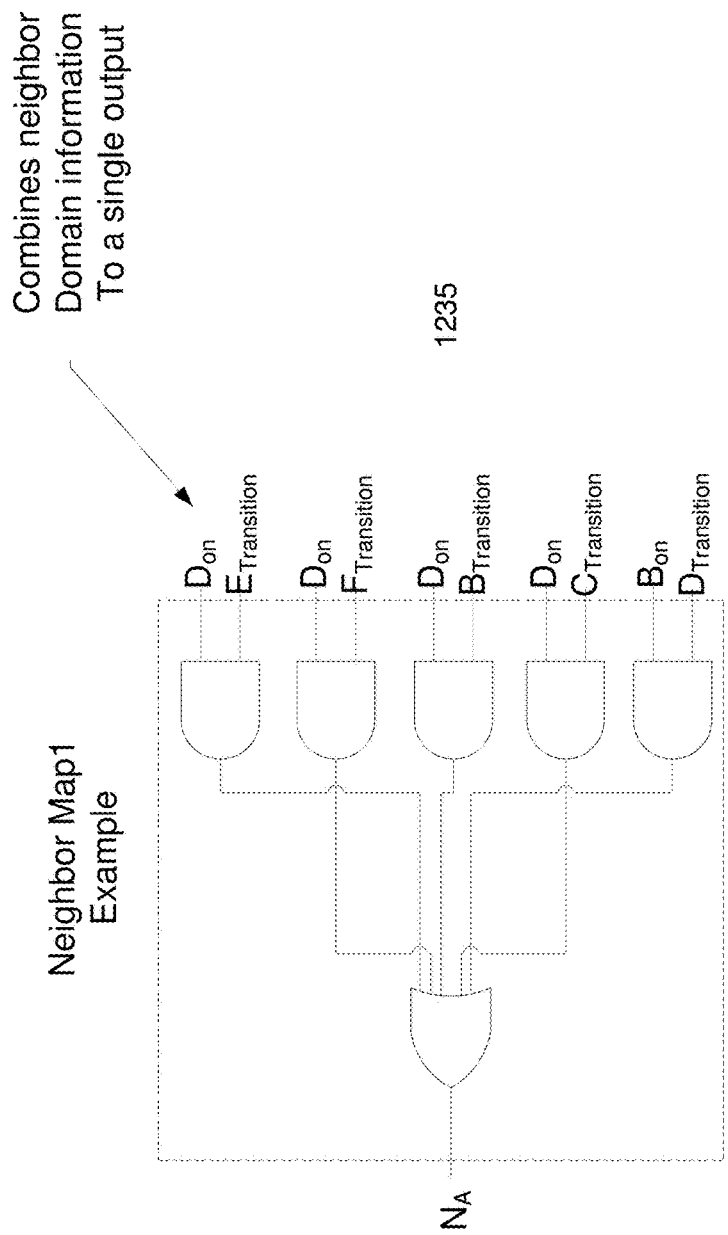
FIG. 12 shows an example neighbor map circuit that is used between voltage domains.

FIG. 12 shows an example neighbor map 1 circuit that is used between voltage domains. The neighbor map 1 logic 1235 is a single OR gate and AND gates to decode the state of power domain in other voltage domains that are neighbors. Here only a single output is produced to say if there is a conflict or not. Each neighbor map1 logic block is from the view point of a single power domain. The logic for power domain A is D(on) and E(transition) or D(on) and F(transition) or D(on) and B(transition) or D(on) and C(transition) or B(on) and D(transition).

Example IP Cores and Interconnect Fabric for a System on a Chip Using a Power Manager with One or More Power Switch Arbiters FIG. 1A illustrates a block diagram of an embodiment of a System-on-a-Chip. Diagram 100 includes multiple initiator IP cores (IC) and multiple target IP cores (TC) that communicate read and write requests as well as responses to those requests over a network on the chip/interconnect fabric 118. The interconnect fabric 118 may also be referred to as a packet-based switch network because the data transferred within the fabric is in the forms of packets. Some examples of an IC may include a CPU IP core 102, an on-chip security IP core 104, a digital signal processor (DSP) IP core 106, a multimedia IP core 108, a graphics IP core 110, a streaming input-output (I/O) IP core 112, a communications IP core 114 (e.g., a wireless transmit and receive IP core with devices or components external to the chip, etc.), etc.

In general, in an interconnection network, there are a number of heterogeneous initiator agents (IAs) and target agents (TAs) and routers. The packets travel from the IAs to the TAs in a request network and from the TAs to the IAs in the response network Each IC may have its own initiator agent (IA) (e.g., IA 142, IA 144, etc.) to interface with the fabric 118. Some examples of a TC may include DRAM IP core 120 through DRAM IP core 126 and FLASH memory IP core 128. Each TC may have its own target agent (TA) (e.g., TA 160, TA 162) to interface with the fabric 118. Each of the DRAM IP cores 120-126 may have an associated memory controller. Similarly, the flash memory 128 is associated with a flash controller. All of the ICs 102-114 and TCs 120-128 may operate at different performance rates (i.e. peak bandwidth, which can be calculated as the clock frequency times the number of data bit lines (also known as data width), and sustained bandwidth, which represents a required or intended performance level). The fabric 118 may be part of an integrated circuit, such as System-on-a-Chip (SoC).

The programmable behavior configuration register 180 is programmable by the System-on-a-Chip designer to convey a desired behavior for the power up sequencing for the set of power domains, based on programmed behaviors selected by the System-on-a-Chip designer in the behavior register. The System on a Chip is partitioned into multiple power domains. For example, DRAM 120 to DRAM 124 may be powered from, for example, a first voltage source. Flash 128 and DSP 106 may be powered from, for example, a second voltage source.

The System on a Chip has power rails of different width dimensions; and thus, different electrical current capacities. A first instance of the power switch arbiter actively controls a largest amount of instantaneous electrical current a first power rail can possibly experience. Likewise, second instance of the power switch arbiter actively controls a largest amount of instantaneous electrical current a second power rail without dropping below the minimum allowable supply voltage level for a second voltage supply circuit.

The first power rail may connect to, for example, a first voltage source. The power switch arbiter allows SoC designer to make smaller and customized power rails due to the presence of the power switch arbitrator configurably and then actively controlling the largest amount of electrical current that section of the SoC will experience. Previously, SoC designers has to use the larger power rails in all cases. As discussed, a SoC designer had to anticipate slower switch turn on times with the minimum electrical current draw. The second power rail may have a different width dimension than the first power rail. Each different width power rail may have its own instance of a power switch arbiter.

The System-on-a-Chip also includes multiple initiator IP cores (IC) and multiple target IP cores (TC) that communicate read and write requests as well as responses to those requests over an interconnect fabric. A first instance and a second instance of the power switch arbitrator are configured to be in communication with each other regarding power domains and their instantaneous electrical current draw.

Instances of the power switch arbitrator can be geographically located in an electrical supply path in between that power domain's voltage regulator circuit and the power domain itself. In an example, a first instance of a power switch arbitrator can be geographically located in an electrical supply path either i) in between that power domains voltage regulator circuit supply to the power domain's circuits or ii) in between the power domain circuits and the electrical ground wire(s) for that power domain.

Routing Network

FIG. 1B illustrates a block diagram of an embodiment of an interconnect, for a System-on-a-Chip, with multiple routers with sequencing logic configured to reference a table or similar component, which is programmable by the System on a Chip designer, to include at least instantaneous electrical current draws of powering up each power domain, addresses of the power domains, and whether they neighbor each other. FIG. 1B is similar to the FIG. 1A but with the addition of the routers in the interconnect fabric 118. FIG. 1B 155 illustrates a response network where the information flows to the ICs and IAs from the target agents and TCs. Although not illustrated, there is a corresponding response network that connects the TCs and the target agents to the IAs and ICs and routes transactions accordingly. The routers may be used to route packets within the fabric 118 from a source location (e.g., the ICs 102-114) to a destination location (e.g., the TCs 120-128) in the integrated circuit. There may be multiple routers in the fabric 118. The number of routers may be implementation specific (e.g., topology used, area requirement, latency requirement, etc.). The data sent from the IC 102 to the TC 122 may be packetized by packetizing logic associated with the target agent 160 before being sent into the fabric 118. The packets may pass through the routers 150 through 158. The packets may then be depacketized by depacketizing logic associated with the initiator agent 142 when they leave the fabric 118. Similarly, the data sent from the TC 126 to the IC 108 may be packetized by packetizing logic associated with the target agent 162 before being sent into the fabric 118. The packets may pass through the routers 151, 155, & 156. The packets may then be depacketized by depacketizing logic associated with the initiator agent 146 when they leave the fabric 118. Likewise, illustrated in FIG. 1B is the data flowing from target agent 160 to the router 155 to the router 156 to the router 150 to IA 146 of the IC 108, where each individual link/routing path between these components may have formatted transactions.

The sequencing logic is configured to reference a configurable register 180, which is programmable by the System on a Chip designer, to include at least instantaneous electrical current draws of powering up each power domain, addresses of the power domains, and whether they neighbor each other.

The network on a chip/interconnect fabric implements many concepts including one or more of: a credit flow control scheme in a router with flexible link widths utilizing minimal storage; use of common data formats to facilitate link width conversion in a router with flexible link widths; a design of a router with a configurable number of pipelines; efficient header generation in packetized protocols for flexible SoC architectures; table based transfer function generation in SoCs; Clocking techniques; an enhanced end-to-end PL definition, which "combines the packet-based fabric delivery and the message-transfer-based fabric delivery; an efficient method to perform interleaving of responses with different transaction ID; a low cost methods to achieve adaptive transaction and packet interleaving in interconnection networks; efficient schemes to quiescence and wakeup power management domains in a highly partitioned NoC based SoC; mesochronous and asynchronous synchronizers with credit based flow control; an area efficient mesochronous synchronizer design; as well as many additional concepts.

FIG. 2 illustrates a block diagram of an embodiment of a System-on-a-Chip having multiple initiator IP cores and multiple target IP cores that communicate transactions, such as read and write requests, burst requests, etc., as well as responses to those request transactions over the interconnect network. Each initiator IP core, such as a CPU IP core 102, ARC core 104, a Digital display IP core 103, DMA engine IP core, DAC IP core, and other similar IP cores may have its own initiator agent to interface that IP core to the remainder of the interconnect network 118. Each target IP core, such as a first DRAM IP core 120 or a Read Only Memory IP Core 108, may have its own target agent to interface that IP core to the remainder of the interconnect network 118. Each DRAM IP core 120 may have an associated memory scheduler as well as DRAM controller. The interconnect network 118 is used to communicate and route the transactions between these multiple initiator IP cores and the one or more target IP cores in the integrated circuit. An integrated-circuit-system-power-manager generally controls the power domains containing the different initiator and target IP cores in the integrated circuit. However, the interconnect network 118 itself may be partitioned into having its own multiple power domains which are controlled by the interconnect-power-manager 106 cooperating with the integrated-circuit-system-power-manager. The Interconnect network 118 can be partitioned into these multiple domains to allow for flexible power management control by the external integrated-circuit-system-power-manager cooperating and interfacing with the interconnect-power-manager 106. The interconnect network spans multiple power domains. Pieces of the interconnect network are implemented in a set of power domains, each of which may include other, non-interconnect logic and components. Each such partition of the interconnect, may be a unique power domain within the chip ("its own power domain"), or it may be part of an existing power domain that includes some initiator IP core logic and/or target IP core logic.

The interconnect-power-manager 106 may cooperate with one or more instances of a power switch arbiter. The interconnect-power-manager 106 may cooperate with the integrated-circuit-system-power-manager to decouple activity management from power management in the multi-domain interconnect. The interconnect-power-manager can be configured to control transaction activity management within the multiple power domains within the interconnect network by sending one or more signals to either quiesce or awaken the interconnect network components contained within these multiple power domains. The integrated-circuit-system-power-manager is configured to turn power on and off to the multiple power domains within the interconnect network. The integrated-circuit-system-power-manager turns off power to a given power domain when all of the components within that given power domain in the integrated circuit are quiesced. The components in the interconnect network are quiesced, which includes being temporarily rendered inactive/idle by following a command from the interconnect-power-manager. The interconnect-power-manager decouples transaction activity management in the multiple power domains from the integrated-circuit-system-power-manager's control of power management in order to allow interconnect network components to be contained in two or more power domains along with at least one of 1) an initiator Intellectual Property core, 2) a target IP core, and 3) any combination of both within each of those two or more power domains.

Figure 3:
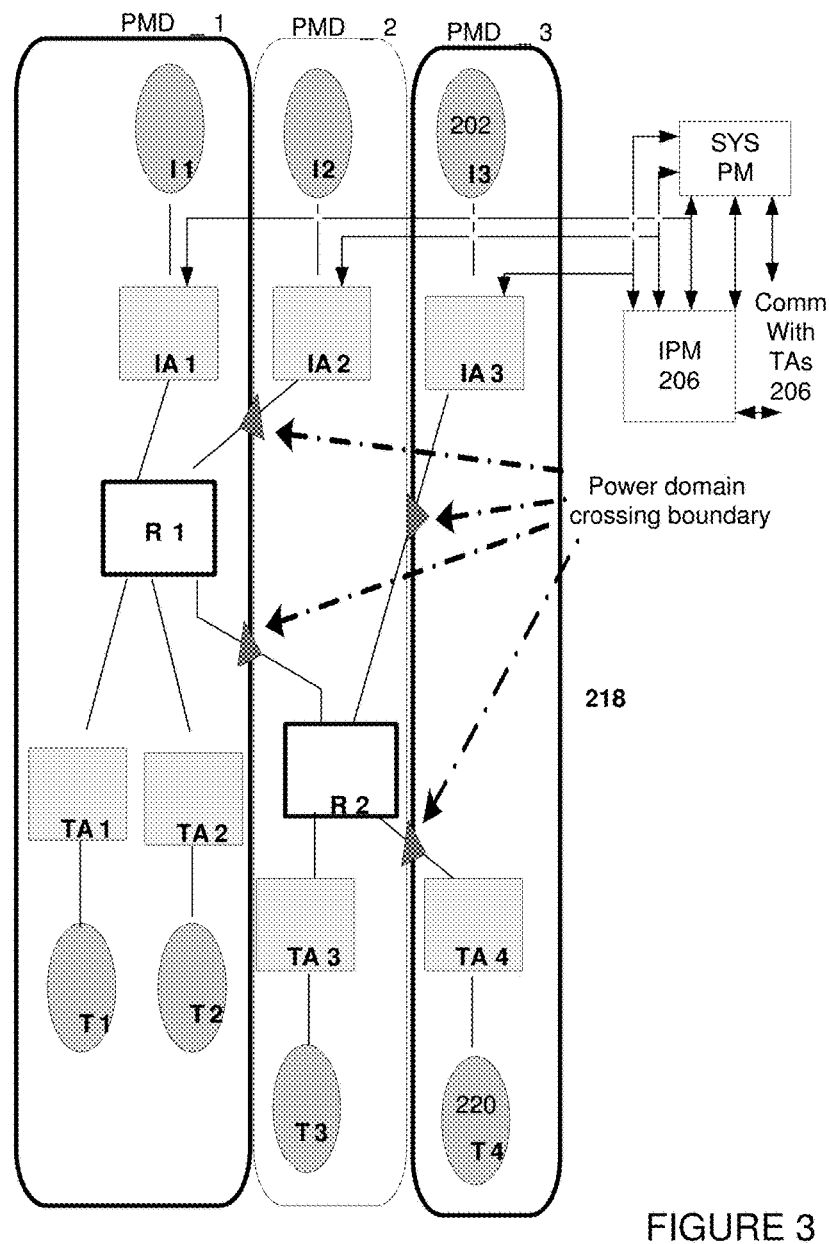
FIG. 3 illustrates a block diagram of a simple embodiment of an interconnect network that has multiple power domains in which a routing pathway for transactions in the interconnect network spans across one or more power domain boundaries.

FIG. 3 illustrates a block diagram of a simple embodiment of an interconnect network that has multiple power domains in which a routing pathway for transactions in the interconnect network spans across one or more power domain boundaries. The Interconnect network 218 may couple transactions between the multiple initiator IP cores, such as CPU IP core 202, and the multiple target IP cores such as a DRAM IP core 220.

The example interconnect network 218 uses two routers R1 and R2 to achieve the desired connectivity between the multiple initiator IP cores and the multiple target IP cores. The integrated circuit including the interconnect network is partitioned into three example power domains. Each power domain has an example set of components within that power domain as shown in the table in FIG. 9. For example, the user has programmed in that the first power domain contains the initiator IP core I1, initiator agent IA1, target agent TA1, target IP core T1, target agent TA2, target IP core T2, and router R1. Another power domain contains the initiator IP core I3, initiator agent IA3, target agent TA4, and target IP core T4. The power domain may contain system components, such as an initiator core, as well as components within the interconnect network itself. The components within a given power domain may be stored in a table in the power domain controller or be supplied as configuration variables into software in the EDA tools which then generates the appropriate combinational logic to account for the components in a given domain.

The interconnect network 218 is partitioned into multiple power domains in the integrated circuit and has integrated hardware circuitry in an interconnect-power-manager to manage a quiescent state for all interconnect network components in each power domain in the interconnect when a routing pathway for transactions in the interconnect network 218 spans across one or more power domain boundaries and causes interdependencies of power domains within the interconnect network 218 other than where the power domains of an initiator agent of a new transaction and final target agent of the new transaction are located within. Thus, the interconnect-power-manager 206 may be configured to manage a quiesce state of the interconnect components in the power domain, not for all of the components on the IC in the power domain. For example, to complete a sending of a new request transaction from initiator core I2 to target IP core T4 requires components in three different power domains to be powered up, and three power domain boundary crossings. The new request transaction from initiator core I2 in the second power domain needs to traverse to initiator agent IA2 and then across a power domain boundary to router R1, then back across a power domain boundary to router R2, and then across another a power domain boundary to target agent 4, and then onto target IP core 4. Likewise, a response transaction from target agent 4 to initiator IP core I3 requires two power domain crossings within the interconnect network even though to the integrated-circuit-system-power-manager those two IP cores are in the same power domain, PMD-3. Each initiator core coupled to its initiator agent and each target core coupled to its target agent have their power state managed by an integrated-circuit-system-power-manager, which is separate than the interconnect-power-manager 206 managing the multiple power domains of the interconnect network 218. The interconnect-power-manager 206 has hardware circuitry and signaling ports configured to cooperate and communicate with the integrated-circuit-system-power-manager and different agents within the interconnect network 218. The integrated-circuit-system-power-manager cooperates and communicates with the interconnect-power-manager 206 to quiesce and wake up one or more power domains within the interconnect network 218. The multiple power domains of the interconnect network as well those containing the IP cores themselves are controllable by the integrated-circuit-system-power-manager component, which is external to the interconnect network 218.

A relevant initiator agent set for a particular power domain, such as power domain_k, may be as follows. This relevant initiator agent set is comprised of a) initiator agents in power domain k, b) initiator agents which communicate with the target agents in power domain_k, and c) initiator agents which use routers in power domain_k to communicate with target agents (based on the connectivity matrix). Combinational logic and status registers in each initiator agent can be used to represent the relevant initiator agent set for a power domain. The integrated-circuit-system-power-manager may control power management within the interconnect network by monitoring only status registers located within each of the initiator agents. The status registers indicate a composite of the quiescent state for all interconnect network components including initiator agents, target agents, and routers in each power domain in the interconnect network that have connectivity to that initiator agent.

The states of quiescing/idling of a given component may be thought of as the same. The logic in the interconnect-power-manager 206 and each of the initiator agents, such as initiator agent IA3, is configured to track a quiescent state of components and routing interdependencies of other power domains in the interconnect network 218 needed to route a transaction between that initiator agent to other target and initiator cores connected to that initiator agent on a per power domain basis.

The hardware circuitry within the interconnect-power-manager 206 Awakens and quiesces the multiple power domains within the interconnect network 218. The interconnect-power-manager 206 also has signaling interfaces with other target IP cores, initiator IP cores, and interconnect network components. The integrated-circuit-system-power-manager manages the power domains where the IP target cores, initiator cores and interconnect network components are located within. The advanced partitioning of sections of the interconnect network 218 allows efficient power management of the multiple power domains in the system on the chip, where each power domain in the interconnect network 218 is separately controllable from other power domains in the interconnect network 218 by the interconnect-power-manager 206. In an embodiment, the interconnect-power-manager 206 does not control voltage supply or clocks to those domains. It only controls whether new activity is permitted to enter those domains.

The interconnect-power-manager 206 may include 1) logic within itself including a network of state machines dispersed throughout the interconnect network, 2) logic within itself including a network of state machines located all in a single location within the interconnect network, 3) logic and registers in the initiator agents dispersed throughout the interconnect network, 4) logic and signaling ports in the connection protocol controllers at link interfaces such as PL, OCP, & AXI, and 5) any combinations of these implementations. In an embodiment, the set of power domain controllers (PDCs) with their interfaces form the interconnect-power-manager 206.

Figure 13A:
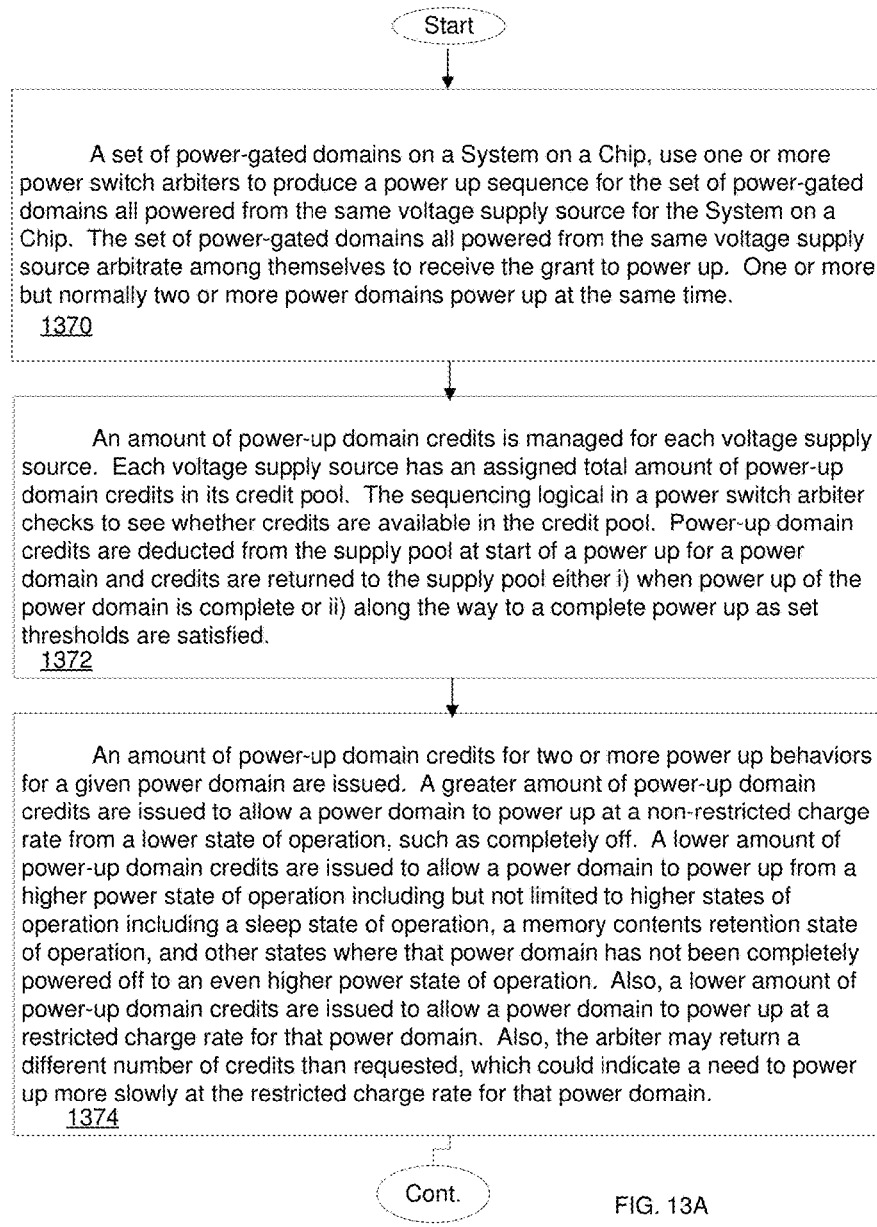

FIGS. 13A and 13B illustrate an embodiment of a flow chart of one or more power switch arbiters managing a power up sequence. An example sequence of steps may be as follows.

In step 1370, a set of power-gated domains on a System on a Chip use one or more power switch arbiters to produce a power up sequence for the set of power-gated domains all powered from the same voltage supply source for the System on a Chip. The set of power-gated domains all powered from the same voltage supply source arbitrate among themselves to receive the grant to power up. One or more but normally two or more power domains power up at the same time.

In step 1372, an amount of power-up domain credits is managed for each voltage supply source. Each voltage supply source has an assigned total amount of power-up domain credits in its credit pool. The sequencing logic in a power switch arbiter checks to see whether credits are available in the credit pool. Power-up domain credits are deducted from the supply pool at start of a power up for a power domain and credits are returned to the supply pool either i) when power up of the power domain is complete or ii) along the way to a complete power up as set thresholds are satisfied.

In step 1374, an amount of power-up domain credits for two or more power up behaviors for a given power domain are issued. A greater amount of power-up domain credits are issued to allow a power domain to power up at a non-restricted charge rate from a lower state of operation, such as completely off. A lower amount of power-up domain credits are issued to allow a power domain to power up from a higher power state of operation including but not limited to higher states of operation including a sleep state of operation, a memory contents retention state of operation, and other states where that power domain has not been completely powered off to an even higher power state of operation. Also, a lower amount of power-up domain credits are issued to allow a power domain to power up at a restricted charge rate for that power domain. Also, the arbiter may return a different number of credits than requested, which could indicate a need to power up more slowly at the restricted charge rate for that power domain.

In step 1376, two or more of the power-gated domains are simultaneously powered up from a lower power state of operation to a higher power state of operation.

In step 1378, the arbiter may delay in time the powering up of one or more power-gated domains relative to other power-gated domains in the set of power-gated domains to limit an amount of the different power domains simultaneously powering up to a maximum amount. The arbiter limits an amount of different power domains simultaneously powering up to be less than enough instantaneous electrical current drawn on the same voltage supply circuit to cause a reduction below a minimum allowable supply voltage level for the same voltage supply circuit.

In step 1380, the System on a Chip has two or more voltage supply sources each supplying a different nominal voltage supply level, and where the two or more voltage supply sources may be arbitrated in parallel with each other.

In step 1382, the power switch arbiter also considers additional aspects such as i) what priority is associated with a first domain in the set of power domains in a programmable relative domain priority scheme and/or ii) whether a neighboring power domain is powering up, where credits are reserved for latency-sensitive domains to ensure they do not get blocked (to bound maximum power up response time).

In step 1384, the power switch arbiter avoids power up starvation of domains via use of a round robin arbitration scheme.

Simulation and Modeling

Figure 9:
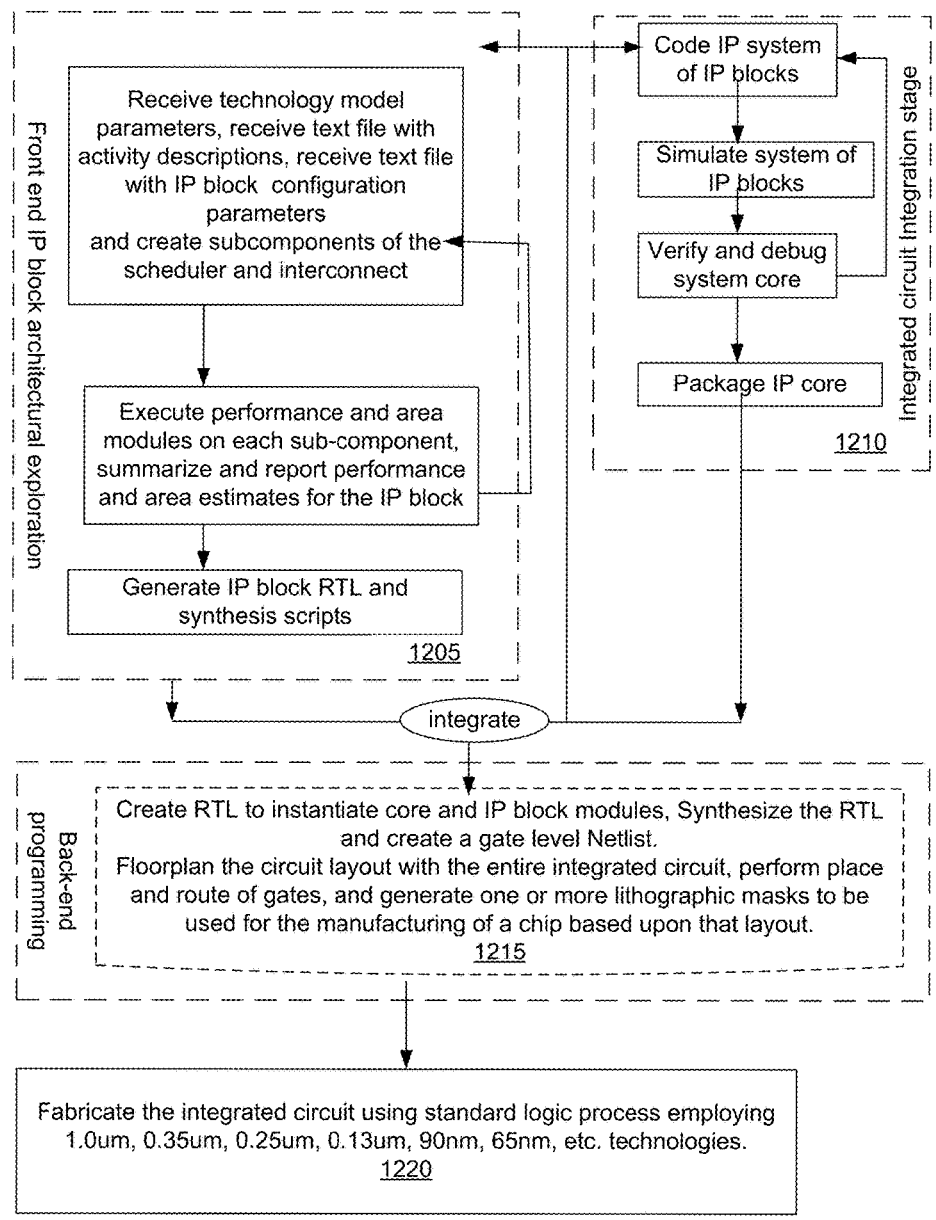
FIG. 9 illustrates a flow diagram of an embodiment of an example of a process for generating a device, such as a System on a Chip with one or more power switch arbiters, in accordance with the systems and methods described herein.

FIG. 9 illustrates a flow diagram of an embodiment of an example of a process for generating a device, such as a System on a Chip with one or more power switch arbiters, in accordance with the systems and methods described herein. The example process for generating a device with designs of the Interconnect may utilize an electronic circuit design generator, such as a System on a Chip compiler, to form part of an Electronic Design Automation (EDA) toolset. Hardware logic, coded software, and a combination of both may be used to implement the following design process steps using an embodiment of the EDA toolset. The EDA toolset such may be a single tool or a compilation of two or more discrete tools. The information representing the apparatuses and/or methods for the circuitry in the Interconnect, Memory Scheduler, etc. may be contained in an Instance such as in a cell library, soft instructions in an electronic circuit design generator, or similar machine-readable storage medium storing this information. The information representing the apparatuses and/or methods stored on the machine-readable storage medium may be used in the process of creating the apparatuses, or model representations of the apparatuses such as simulations and lithographic masks, and/or methods described herein.

Aspects of the above design may be part of a software library containing a set of designs for components making up the scheduler and Interconnect and associated parts. The library cells are developed in accordance with industry standards. The library of files containing design elements may be a stand-alone program by itself as well as part of the EDA toolset.

The EDA toolset may be used for making a highly configurable, scalable System-On-a-Chip (SOC) inter block communication system that integrally manages input and output data, control, debug and test flows, as well as other functions. In an embodiment, an example EDA toolset may comprise the following: a graphic user interface; a common set of processing elements; and a library of files containing design elements such as circuits, control logic, and cell arrays that define the EDA tool set. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect and logic circuitry on a machine-readable storage medium. The machine-readable medium may have data and instructions stored thereon, which, when executed by a machine, cause the machine to generate a representation of the physical components described above. This machine-readable medium stores an Electronic Design Automation (EDA) toolset used in a System-on-a-Chip design process, and the tools have the data and instructions to generate the representation of these components to instantiate, verify, simulate, and do other functions for this design.

Generally, the EDA toolset is used in two major stages of SOC design: front-end processing and back-end programming. The EDA toolset can include one or more of a RTL generator, logic synthesis scripts, a full verification testbench, and SystemC models.

Front-end processing includes the design and architecture stages, which includes design of the SOC schematic. The front-end processing may include connecting models, configuration of the design, simulating, testing, and tuning of the design during the architectural exploration. The design is typically simulated and tested. Front-end processing traditionally includes simulation of the circuits within the SOC and verification that they should work correctly. The tested and verified components then may be stored as part of a stand-alone library or part of the IP blocks on a chip. The front-end views support documentation, simulation, debugging, and testing.

In block 1205, the EDA tool set may receive a user-supplied text file having data describing configuration parameters and a design for at least part of a tag logic configured to concurrently perform per-thread and per-tag memory access scheduling within a thread and across multiple threads. The data may include one or more configuration parameters for that IP block. The IP block description may be an overall functionality of that IP block such as an Interconnect, memory scheduler, etc. The configuration parameters for the Interconnect IP block and scheduler may include parameters as described previously.

The EDA tool set receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

The EDA tool set may partition the IP block design by creating an abstract executable representation for each IP sub component making up the IP block design. The abstract executable representation models TAP characteristics for each IP sub component and mimics characteristics similar to those of the actual IP block design. A model may focus on one or more behavioral characteristics of that IP block. The EDA tool set executes models of parts or all of the IP block design. The EDA tool set summarizes and reports the results of the modeled behavioral characteristics of that IP block. The EDA tool set also may analyze an application's performance and allows the user to supply a new configuration of the IP block design or a functional description with new technology parameters. After the user is satisfied with the performance results of one of the iterations of the supplied configuration of the IP design parameters and the technology parameters run, the user may settle on the eventual IP core design with its associated technology parameters.

The EDA tool set integrates the results from the abstract executable representations with potentially additional information to generate the synthesis scripts for the IP block. The EDA tool set may supply the synthesis scripts to establish various performance and area goals for the IP block after the result of the overall performance and area estimates are presented to the user.

The EDA tool set may also generate an RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In block 1210, a separate design path in an ASIC or SoC chip design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly. The system designer codes the system of IP blocks to work together. The EDA tool set generates simulations of representations of the circuits described above that can be functionally tested, timing tested, debugged and validated. The EDA tool set simulates the system of IP block's behavior. The system designer verifies and debugs the system of IP blocks' behavior. The EDA tool set tool packages the IP core. A machine-readable storage medium may also store instructions for a test generation program to generate instructions for an external tester and the interconnect to run the test sequences for the tests described herein. One of ordinary skill in the art of electronic design automation knows that a design engineer creates and uses different representations, such as software coded models, to help generating tangible useful information and/or results. Many of these representations can be high-level (abstracted and with less details) or top-down views and can be used to help optimize an electronic design starting from the system level. In addition, a design process usually can be divided into phases and at the end of each phase, a tailor-made representation to the phase is usually generated as output and used as input by the next phase. Skilled engineers can make use of these representations and apply heuristic algorithms to improve the quality of the final results coming out of the final phase. These representations allow the electric design automation world to design circuits, test and verify circuits, derive lithographic mask from Netlists of circuit and other similar useful results.

In block 1215, next, system integration may occur in the integrated circuit design process. Back-end programming generally includes programming of the physical layout of the SOC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SOC containing the system of IP blocks. The system of IP blocks with the fixed RTL and synthesis scripts may be simulated and verified. Synthesizing of the design with Register Transfer Level (RTL) may occur. The logic synthesis tool synthesizes the RTL design to create a gate level Netlist circuit design (i.e. a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist can also describe the connectivity of an electronic design such as the components included in the design, the attributes of each component and the interconnectivity amongst the components. The EDA tool set facilitates floor planning of components including adding of constraints for component placement in the space available on the chip such as XY coordinates on the chip, and routes metal connections for those components. The EDA tool set provides the information for lithographic masks to be generated from this representation of the IP core to transfer the circuit design onto a chip during manufacture, or other similar useful derivations of the circuits described above. Accordingly, back-end programming may further include the physical verification of the layout to verify that it is physically manufacturable and the resulting SOC will not have any function-preventing physical defects.

In block 1220, a fabrication facility may fabricate one or more chips with the signal generation circuit utilizing the lithographic masks generated from the EDA tool set's circuit design and layout. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm or less, to fabricate the chips. The size of the CMOS logic process employed typically defines the smallest minimum lithographic dimension that can be fabricated on the chip using the lithographic masks, which in turn, determines minimum component size. According to one embodiment, light including X-rays and extreme ultraviolet radiation may pass through these lithographic masks onto the chip to transfer the circuit design and layout for the test circuit onto the chip itself.

The EDA toolset may have configuration dialog plug-ins for the graphical user interface. The EDA toolset may have an RTL generator plug-in for the SocComp. The EDA toolset may have a SystemC generator plug-in for the SocComp. The EDA toolset may perform unit-level verification on components that can be included in RTL simulation. The EDA toolset may have a test validation testbench generator. The EDA toolset may have a dis-assembler for virtual and hardware debug port trace files. The EDA toolset may be compliant with open core protocol standards. The EDA toolset may have Transactor models, Bundle protocol checkers, OCP to display socket activity, OCPPerf2 to analyze performance of a bundle, as well as other similar programs.

As discussed, an EDA tool set may be implemented in software as a set of data and instructions, such as an instance in a software library callable to other programs or an EDA tool set consisting of an executable program with the software cell library in one program, stored on a machine-readable medium. A machine-readable storage medium may include any mechanism that stores information in a form readable by a machine (e.g., a computer). For example, a machine-readable medium may include, but is not limited to: read only memory (ROM); random access memory (RAM); magnetic disk storage media; optical storage media;

flash memory devices; DVD's; EPROMs; EEPROMs; FLASH, magnetic or optical cards; or any other type of media suitable for storing electronic instructions. However, a machine-readable storage medium does not include transitory signals. The instructions and operations also may be practiced in distributed computing environments where the machine-readable media is stored on and/or executed by more than one computer system. In addition, the information transferred between computer systems may either be pulled or pushed across the communication media connecting the computer systems.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. For example, the encoding and decoding of the messages to and from the CDF may be performed in hardware, software or a combination of both hardware and software. It has proven convenient at times, principally for reasons of common usage, to refer to these signals as bits, values, elements, symbols, characters, terms, numbers, or the like. While some specific embodiments of the invention have been shown the invention is not to be limited to these embodiments. The invention is to be understood as not limited by the specific embodiments described herein, but only by scope of the appended claims.

The additional documents and descriptions herein include these and other aspects of the design.

The invention claimed is:

1. An apparatus for managing power on a System on a Chip, comprising:
    a power switch arbitrator configured to govern an arbitration between different power domains and a sequencing of powering up the different power domains supplied by a first voltage supply circuit on the System on a Chip,
        where the power switch arbitrator has arbitration logic to arbitrate at approximately the same time and sequencing logic to limit a number of the different power domains simultaneously powering up to a maximum amount of domains, wherein powering up the maximum amount of power domains draws an amount of instantaneous electrical current from the first voltage supply circuit that is low enough to not cause a drop in voltage level below a minimum allowable supply voltage level for the first voltage supply circuit,
    where the sequencing logic of the power switch arbitrator is configured to provide the sequencing of powering up the different power domains that takes into account at least the following aspects of
        I) a first reference table or register configured to convey whether a first power domain and a second power domain arbitrating to power up a) are part of a set of power domains that share a same voltage domain powered by the first voltage supply circuit, and/or b) are powered from different voltage domains;
        II) a second reference table or register configured to convey a first amount of an instantaneous electrical current drawn by the first power domain to power up as well as a third reference table or register configured to convey a second amount of instantaneous electrical current drawn by the second power domain from the first voltage supply circuit, which both are either 'factored into' or 'compared to' a domain credits value from a fourth reference table or register configured to convey a predicted maximum amount instantaneous electrical current draw from the first voltage supply circuit before a reduction in voltage occurs below the minimum allowable supply voltage level for the first voltage supply circuit; and
        III) a credit counter arrangement configured to manage a total amount of instantaneous electrical currently being drawn from the first voltage supply circuit from any power domains at the time period of when the first power domain and second power domain submit their arbitration requests to power up;
    where the sequencing logic is configured to allow the first power domain and second power domain to power up at the same time at a non-restricted power up rate as long as the supplied amount of instantaneous electrical current from the first voltage supply circuit is low enough to not cause the drop in voltage level to below the minimum allowable supply voltage level for the first voltage supply circuit;
    and when the first and second power domains powering up at the same time at the non-restricted power up rate would predictably cause an excessive amount of instantaneous electrical current to be drawn that would cause the drop in voltage level to below the minimum allowable supply voltage level for the first voltage supply circuit, then the sequencing logic governs the power up sequencing to cause any one of the following three behaviors, based on programmed behaviors selected by a System on a Chip designer,
        i) the sequence logic delays in time sequentially waking up and powering up the second power domain after the first power domain so that a supply voltage level from the first voltage supply circuit does not drop below the minimum allowable supply voltage level for the first voltage supply circuit, or
        ii) the sequence logic allows both the first and second power domains to power up, at the same time, at a limited electrical current draw rate set at an amount to not cause the drop in voltage level to below the minimum allowable supply voltage level for the first voltage supply circuit, or
        iii) the sequence logic allows the first power domain to power up at a substantially greater rate of charge than the second power domain for a staggered amount of time but a total draw of instantaneous electrical current between the first and second power domains powering up at the same time from the first voltage supply circuit will not cause the drop in voltage level to below the minimum allowable supply voltage level for the first voltage supply circuit.

2. The apparatus for managing power of claim 1, further comprising:
    a timer circuit configured to track when one or more power domains in the set of different power domains supplied by the first voltage supply circuit are in a state of powering up; and thus, tracks a summation of instantaneous electrical current draws over time from the different power domains in the set, which a total summation of electrical current draws that could affect supply voltage droop and cause the drop in the voltage level from the first voltage supply circuit to below the minimum allowable supply voltage level for the first voltage supply circuit, where the timer circuit is configured to supply feedback to affect the domain credits value from the fourth reference table or register that conveys the predicted maximum amount instantaneous electrical current draw from the first voltage supply circuit before the reduction in voltage occurs below the minimum allowable supply voltage level for the first voltage supply circuit.

3. The apparatus for managing power of claim 1, where the sequencing logic is configured to take into account both instantaneous electrical current as well as an additional aspect that has its own set of power domains that have that additional aspect in common, which then that additional aspect of the power domain is taken into account for arbitrating power up requests from all of the power domains on a system of a chip.

4. The apparatus for managing power of claim 1, where the sequencing logic also takes into account at least the following aspect of geography of the power domain arbitrating to power up relative to a physical location of other power domains arbitrating to power up at approximately same time; and thus, an algorithm employed by the sequencing logic of the power switch arbitrator factors in both of these conditions 1) an amount of neighboring power domains sharing a common resource with any of the power domains in the set that share the first voltage supply circuit, when those neighboring power domains are in a state of powering up, and 2) the total amount of instantaneous electrical current draw of power domains in the set of power domains that share the first voltage supply circuit wanting to be powered up at substantially a same point in time.

5. The apparatus for managing power of claim 4, where the sequencing logic is configured to reference a table or similar component, which is programmable by the System on a Chip designer, to include at least instantaneous electrical current draws of powering up each power domain, addresses of the power domains, and whether they neighbor each other.

6. The apparatus for managing power of claim 1, where a first instance of a power switch arbitrator is physically located in an electrical supply path in between a voltage regulator circuit of the first power domain and electrical loads of the first power domain.

7. The apparatus for managing power of claim 1, where the System on a Chip is partitioned into multiple power domains, where the System on a Chip has power rails of different width dimensions; and thus, different electrical current capacities, and a first instance of the power switch arbitrator actively controls a largest amount of instantaneous electrical current a first power rail can possibly experience without dropping below the minimum allowable supply voltage level for the first voltage supply circuit, and a second instance of the power switch arbitrator actively controls a largest amount of instantaneous electrical current a second power rail without dropping below a minimum allowable supply voltage level for a second voltage supply circuit, where the second power rail has a different width dimension than the first power rail.

8. A non-transitory machine-readable medium having data and instructions stored thereon, which, when executed by a machine, cause the machine to generate a representation of the apparatus of claim 1, wherein the machine-readable medium stores an Electronic Design Automation (EDA) toolset used in a System-on-a-Chip design process that has the data and instructions to generate the representations of the apparatus.

9. The apparatus for managing power of claim 1, further comprising:
a first event monitor located on the first power domain, which is configured to detect if that power domain has completely powered up and then convey an activity signal to the credit counter arrangement configured to convey the predicted total amount of instantaneous electrical currently being drawn from the first voltage supply circuit from any other power domains at the time period of when the first power domain and second power domain submit their arbitration requests to power up, so that this can then be used to generate signal to free up credits.

10. The apparatus for managing power of claim 1, where a first instance of the power switch arbitrator has a behavior register for the sequencing logic to reference, where the behavior register is programmable by the System-on-a-Chip designer to convey a desired behavior for the power up sequencing for the set of power domains, based on programmed behaviors selected by the System-on-a-Chip designer in the behavior register, where the selected behavior can have any one of the following three behaviors for the power domains in the set of power domains
i) the sequence logic delays in time sequentially waking up and powering up the second power domain after the first power domain so that a supply voltage level from the first voltage supply circuit does not drop below the minimum allowable supply voltage level for the first voltage supply circuit, or
ii) the sequence logic allows both the first and second power domains to power up, at the same time, at a limited electrical current draw rate set at an amount to not cause the drop in voltage level to below the minimum allowable supply voltage level for the first voltage supply circuit when all of the power domains in the set power up simultaneously, or
iii) the sequence logic allows the first power domain to power up at a substantially greater rate of charge than the second power domain for a staggered amount of time but a total draw of instantaneous electrical current between the first and second power domains powering up at the same time from the first voltage supply circuit will not cause the drop in voltage level to below the minimum allowable supply voltage level for the first voltage supply circuit.

11. The apparatus for managing power of claim 1, where a first instance of the power switch arbitrator has a behavior register for the sequencing logic to reference, where the behavior register is programmable by the System-on-a-Chip designer to convey a desired behavior for the power up sequencing for the set of power domains, based on programmed behaviors selected by the System-on-a-Chip designer in the behavior register, where an amount of power-up domain credits for two or more power up behaviors for a given power domain are issued, where in a first behavior, a greater amount of power-up domain credits are issued to allow a power domain to power up at a non-restricted charge rate from a lower state of operation, where in a second behavior, a lower amount of power-up domain credits are issued to allow a power domain to power up from a higher power state of operation to an even higher power state of operation, where in a third behavior, a lower amount of power-up domain credits are issued to allow a power domain to power up at a restricted charge rate for that power domain, where in a fourth behavior, the power switch arbitrator may return a different number of credits than requested, which could indicate a need to power up more slowly at the restricted charge rate for that power domain, where in a fifth behavior, the arbitrator may delay in time the powering up of one or more power-gated domains relative to other power-gated domains in the set of power-gated domains to limit an amount of the different power domains simultaneously powering up to a maximum amount, where in all behaviors, the power switch arbitrator is configured to draw an amount of instantaneous electrical current from the first voltage supply circuit that is low enough to not cause a drop in voltage below a minimum allowable supply voltage level for the first voltage supply circuit.

12. A method for a set of power-gated domains on a System on a Chip, comprising:

using one or more power switch arbitrators to produce a power up sequence for the set of power-gated domains that are all powered from the same voltage supply source for the System on a Chip;

arbitrating among the set of power-gated domains all powered from the same voltage supply source to grant one or more power domains permission to power up at the same time;

managing an amount of domain credits for each voltage supply source, which has an assigned total amount of credits in its credit pool; where sequencing logic in a power switch arbitrator checks to see whether credits are available in the credit pool, where credits are deducted from the supply pool at a start of a power up for a power domain and then credits are returned to the supply pool either i) when the power up of the power domain is complete or ii) when a set threshold is exceeded on the way to the complete power up;

issuing an amount of credits for two or more power up behaviors for a given power domain, where a greater amount of credits are issued to allow a power domain to power up at a non-restricted charge rate from a lower state of operation, and a lower amount of credits are issued to allow a power domain to power up from 1) a higher power state of operation including but not limited to i) a sleep state of operation, ii) a memory contents retention state of operation, and iii) other states where that power domain has not been completely powered off to 2) an even higher power state of operation, and the lower amount of credits are issued to allow a power domain to power up at a restricted charge rate for that power domain; where the arbitrator may return a different number of credits than requested, which could indicate a need to power up more slowly at a restricted charge rate for that power domain;

powering up one or more of the power-gated domains simultaneously from the lower power state of operation to the higher power state of operation or the even higher power state of operation;

delaying in time the powering up of one or more power-gated domains relative to other power-gated domains in the set of power-gated domains to limit a number of the different power domains simultaneously powering up to a maximum amount of domains, wherein powering up the maximum amount of power domains draws an amount of instantaneous electrical current from a same voltage supply circuit that is low enough to not cause a drop in voltage level below a minimum allowable supply voltage level for the same voltage supply circuit; and where the System on a Chip has two or more voltage supply sources each supplying a different nominal voltage level, and where the two or more voltage supply sources may be arbitrated in parallel with each other.

13. The method of claim 12, where the power switch arbitrator also considers what priority is associated with a first domain in the set of power domains in a programmable relative priority scheme, where credits are reserved for latency-sensitive domains to ensure they do not get blocked.

14. The method of claim 12, where the power switch arbitrator avoids power up starvation of domains via use of a round robin arbitration scheme.

15. A method for managing power on a System on a Chip, comprising:

governing an arbitration between different power domains at approximately the same time;

sequencing powering up of the different power domains supplied by a first voltage supply circuit on the System on a Chip;

limiting a number of the different power domains simultaneously powering up to a maximum amount of domains, wherein powering up the maximum amount of power domains draws an amount of instantaneous electrical current from the first voltage supply circuit that is low enough to not cause a drop in voltage level below a minimum allowable supply voltage level for the first voltage supply circuit;

governing the sequencing of powering up the different power domains that takes into account at least the following aspects of i) whether a first power domain and a second power domain arbitrating to power up i) are part of a set of power domains that share a same voltage domain powered by the first voltage supply circuit, and/or ii) are powered from different voltage domains;

ii) a first amount of an instantaneous electrical current drawn by the first power domain to power up as well as a second amount of instantaneous electrical current drawn by the second power domain from the first voltage supply circuit, which both are either 'factored into' or 'compared to' a domain credits value that corresponds to a predicted maximum amount instantaneous electrical current draw from the first voltage supply circuit before a reduction in voltage occurs below the minimum allowable supply voltage level for the first voltage supply circuit; and iii) manage a total amount of instantaneous electrical currently being drawn from the first voltage supply circuit from any power domains at the time period of when the first power domain and second power domain submit their arbitration requests to power up;

allowing the first power domain and second power domain to power up at the same time at a non-restricted power up rate as long as the supplied amount of instantaneous electrical current from the first voltage supply circuit is low enough to not cause the drop in voltage level to below the minimum allowable supply voltage level for the first voltage supply circuit;

and when the first and second power domains powering up at the same time at the non-restricted power up rate would predictably cause an excessive amount of instantaneous electrical current to be drawn that would cause the drop in voltage level to below the minimum allowable supply voltage level for the first voltage supply circuit, then governing the power up sequencing to cause any one of the following three behaviors, based on programmed behaviors selected by a System on a Chip designer,
  i) delay in time sequentially waking up and powering up the second power domain after the first power domain so that a supply voltage level from the first voltage supply circuit does not drop below the minimum allowable supply voltage level for the first voltage supply circuit, or
  ii) allow both the first and second power domains to power up, at the same time, at a limited electrical current draw rate set at an amount to not cause the drop in voltage level to below the minimum allowable supply voltage level for the first voltage supply circuit, or
  iii) allow the first power domain to power up at a substantially greater rate of charge than the second power domain for a staggered amount of time but a total draw of instantaneous electrical current between the first and second power domains powering up at the same time from the first voltage supply circuit will not cause the drop in voltage level to below the minimum allowable supply voltage level for the first voltage supply circuit.

16. The method for managing power of claim 15, further comprising:
  tracking when one or more power domains in the set of different power domains supplied by the first voltage supply circuit are in a state of powering up; and thus, tracking a summation of instantaneous electrical current draws over time from the different power domains in the set, which a total summation of electrical current draws of could affect supply voltage droop and cause the drop in the voltage level from the first voltage supply circuit to below the minimum allowable supply voltage level for the first voltage supply circuit; and
  supplying feedback to affect the domain credits value that corresponds to the predicted maximum amount instantaneous electrical current draw from the first voltage supply circuit before the reduction in voltage occurs below the minimum allowable supply voltage level for the first voltage supply circuit.

17. The method for managing power of claim 15, further comprising:
  when arbitrating, taking into account at least the following aspect of geography of the power domain arbitrating to power up relative to a physical location of other power domains arbitrating to power up at approximately same time; and thus, factoring in both of these conditions 1) an amount of neighboring power domains sharing a common resource with any of the power domains in the set that share the first voltage supply circuit, when those neighboring power domains are in a state of powering up, and 2) the total amount of instantaneous electrical current draw of power domains in the set of power domains that share the first voltage supply circuit wanting to be powered up at substantially a same point in time.

18. A non-transitory machine-readable medium having data and instructions stored thereon, which, when executed by a machine, cause the machine to generate a representation of the method of claim 15, wherein the machine-readable medium stores an Electronic Design Automation (EDA) toolset used in a System-on-a-Chip design process that has the data and instructions to generate the representations of the apparatus.

19. An apparatus, comprising:
  an arbitrator circuit configured to govern an arbitration between different power domains and sequence powering up the different power domains supplied by the same voltage supply circuit on a System on a Chip, where the arbitrator circuit utilizes sequencing logic to limit a number of the different power domains simultaneously powering up to a maximum amount of domains, wherein powering up the maximum amount of power domains draws an amount of instantaneous electrical current from a same voltage supply circuit that is low enough to not cause a drop in voltage level below a minimum allowable supply voltage level for the same voltage supply circuit, where the sequencing logic is configured to manage the sequencing of powering up the different power domains by taking into account multiple aspects including i) whether different power domains arbitrating to power up are part of a set of power domains that share the same voltage supply circuit, ii) an amount of an instantaneous electrical current drawn, and iii) an amount of domain credits before a reduction in voltage occurs below the minimum allowable supply voltage level for that same voltage supply circuit, where the sequencing logic of the power switch arbitrator is further configured to select a power up sequencing behavior from two or more power up sequencing behaviors using domain credits for powering up different power domains, where the amount of domain credits for each voltage supply source are managed such that the sequencing logic in the power switch arbitrator checks to see whether credits are available in the credit pool.

* * * * *